United States Patent
Conrad et al.

(10) Patent No.: US 11,058,046 B2
(45) Date of Patent: *Jul. 13, 2021

(54) SYSTEM AND METHOD FOR DISPENSING MULTIPLE LOW RATE AGRICULTURAL PRODUCTS

(71) Applicant: AMVAC CHEMICAL CORPORATION, Newport Beach, CA (US)

(72) Inventors: Larry M. Conrad, Walker, IA (US); Richard L. Rice, Collierville, TN (US); Keith Woodruff, Mountainside, NJ (US)

(73) Assignee: AMVAC CHEMICAL CORPORATION, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,937

(22) Filed: Oct. 10, 2019

(65) Prior Publication Data
US 2020/0037492 A1    Feb. 6, 2020

Related U.S. Application Data

(60) Continuation of application No. 16/112,660, filed on Aug. 25, 2018, now Pat. No. 10,470,356, which is a
(Continued)

(51) Int. Cl.
*A01C 7/06* (2006.01)
*A01C 7/08* (2006.01)
(Continued)

(52) U.S. Cl.
CPC ............ *A01C 7/06* (2013.01); *A01C 7/08* (2013.01); *A01C 21/005* (2013.01);
(Continued)

(58) Field of Classification Search
CPC ...... A01C 7/06; A01C 7/00; A01C 7/08; A01C 21/005; A01C 21/00; A01C 23/007;
(Continued)

(56) References Cited

U.S. PATENT DOCUMENTS

| 113,591 A | 4/1871 | Spooner |
| 317,988 A | 5/1885 | Gibbon |

(Continued)

FOREIGN PATENT DOCUMENTS

| WO | 2011025592 A1 | 3/2011 |
| WO | 2013191990 A2 | 12/2013 |

(Continued)

OTHER PUBLICATIONS

Screenshot from http://www.amvacsmartbox.com/AboutSmartBoxiAboulSmartBoxilabid/l03/Default.aspx ,downloaded on Sep. 23, 2016 (1 Page).
(Continued)

*Primary Examiner* — Christopher J. Novosad
(74) *Attorney, Agent, or Firm* — Lawrence N. Ginsberg

(57) ABSTRACT

A system for dispensing multiple low rate agricultural products that includes a multiple low rate agricultural (MLRA) product application device configured to cooperate with a planting equipment monitor assembly positioned to sense a seed being discharged from high speed planting equipment. Each MLRA product application device comprises a common housing for a number of low rate agricultural product input assemblies.

19 Claims, 14 Drawing Sheets
(2 of 14 Drawing Sheet(s) Filed in Color)

Related U.S. Application Data continuation-in-part of application No. 16/107,374, filed on Aug. 21, 2018, now Pat. No. 10,251,337, which is a division of application No. 15/190,652, filed on Jun. 23, 2016, now Pat. No. 10,064,327, said application No. 16/112,660 is a continuation-in-part of application No. 15/981,289, filed on May 16, 2018, now Pat. No. 10,694,655, which is a continuation-in-part of application No. 15/614,547, filed on Jun. 5, 2017, now Pat. No. 10,517,206, which is a continuation-in-part of application No. 14/521,908, filed on Oct. 23, 2014, now Pat. No. 9,820,431, which is a continuation-in-part of application No. 14/468,973, filed on Aug. 26, 2014, now abandoned, said application No. 15/614,547 is a continuation-in-part of application No. 15/816,792, filed on Nov. 17, 2017, now Pat. No. 10,440,878, which is a continuation of application No. 14/521,908, filed on Oct. 23, 2014, now Pat. No. 9,820,431, which is a continuation-in-part of application No. 14/468,973, filed on Oct. 23, 2014, now abandoned, which is a continuation-in-part of application No. 14/468,973, filed on Aug. 26, 2014, now abandoned, said application No. 14/521,908 is a continuation-in-part of application No. 15/614,547, filed on Jun. 5, 2017, now Pat. No. 10,517,206, which is a continuation-in-part of application No. 14/521, 908, filed on Oct. 23, 2014, now Pat. No. 9,820,431, which is a continuation-in-part of application No. 14/468,973, filed on Aug. 26, 2014, now abandoned, which is a continuation-in-part of application No. 15/208,605, filed on Jul. 13, 2016, now Pat. No. 10,058,023.

(60) Provisional application No. 61/870,667, filed on Aug. 27, 2013, provisional application No. 61/895,803, filed on Oct. 25, 2013, provisional application No. 62/346,377, filed on Jun. 6, 2016, provisional application No. 61/870,667, filed on Aug. 27, 2013, provisional application No. 61/895,803, filed on Oct. 25, 2013, provisional application No. 62/048,628, filed on Sep. 10, 2014, provisional application No. 62/188,555, filed on Jul. 3, 2015.

(51) Int. Cl.
*A01C 23/00* (2006.01)
*A01C 23/02* (2006.01)
*A01C 21/00* (2006.01)
*A01M 7/00* (2006.01)
*A01M 9/00* (2006.01)
*A01M 21/04* (2006.01)
*A01C 5/06* (2006.01)

(52) U.S. Cl.
CPC ............ *A01C 23/007* (2013.01); *A01C 23/02* (2013.01); *A01M 7/0092* (2013.01); *A01M 9/0092* (2013.01); *A01C 5/064* (2013.01); *A01M 7/0032* (2013.01); *A01M 21/043* (2013.01)

(58) Field of Classification Search
CPC ......... A01C 23/00; A01C 23/02; A01C 5/064; A01C 5/062; A01C 5/06; A01C 5/00; A01M 7/0092; A01M 7/0089; A01M 7/00; A01M 9/0092; A01M 9/00; A01M 21/043; A01M 21/04; A01M 21/00; A01M 7/0032; A01M 7/0025
See application file for complete search history.

(56) References Cited

U.S. PATENT DOCUMENTS

| | | |
|---|---|---|
| 469,999 A | 3/1892 | Hoos |
| 600,629 A | 3/1898 | Levi |
| 781,693 A | 2/1905 | Tandy |
| 825,263 A | 7/1906 | Jameson et al. |
| 861,355 A | 7/1907 | Brower |
| 868,300 A | 10/1907 | Sohner et al. |
| 924,099 A | 6/1909 | Nelson |
| 931,882 A | 8/1909 | Martin |
| 2,794,407 A | 6/1957 | Wist et al. |
| 4,009,668 A | 3/1977 | Brass et al. |
| 4,497,265 A | 2/1985 | Hood et al. |
| 4,521,908 A | 6/1985 | Miyaji et al. |
| 4,522,340 A | 6/1985 | Gandrud |
| 4,529,073 A | 7/1985 | Lewis |
| 4,570,858 A | 2/1986 | Binter et al. |
| 4,611,606 A | 9/1986 | Hall et al. |
| 4,691,645 A | 9/1987 | Anderson |
| 4,705,220 A | 11/1987 | Gandrud et al. |
| 4,896,615 A | 1/1990 | Hood, Jr. et al. |
| 4,917,304 A | 4/1990 | Mazzei et al. |
| 4,971,255 A | 11/1990 | Conrad |
| 5,024,173 A | 6/1991 | Deckler |
| 5,029,624 A | 7/1991 | McCunn et al. |
| 5,060,701 A | 10/1991 | McCunn et al. |
| 5,125,438 A | 6/1992 | McCunn et al. |
| 5,220,876 A | 6/1993 | Monson et al. |
| 5,224,577 A | 7/1993 | Falck et al. |
| 5,301,848 A | 4/1994 | Conrad et al. |
| 5,379,812 A | 1/1995 | McCunn et al. |
| 5,524,794 A | 6/1996 | Benedetti, Jr. et al. |
| 5,539,669 A | 7/1996 | Goeckner et al. |
| 5,638,285 A | 6/1997 | Newton |
| 5,641,011 A | 6/1997 | Benedetti, Jr. et al. |
| 5,687,782 A | 11/1997 | Cleveland et al. |
| 5,737,221 A | 4/1998 | Newton |
| 5,931,882 A | 8/1999 | Fick et al. |
| 6,070,539 A | 6/2000 | Flamme et al. |
| 6,122,581 A | 9/2000 | McQuinn |
| 6,198,986 B1 | 3/2001 | McQuinn |
| 6,216,615 B1 | 4/2001 | Romans |
| 6,289,829 B1 | 9/2001 | Fish et al. |
| 6,296,226 B1 | 10/2001 | Olsen |
| 6,435,854 B1 | 8/2002 | Sawa et al. |
| 6,748,884 B1 | 6/2004 | Bettin et al. |
| 6,763,773 B2 | 7/2004 | Schaffert et al. |
| 6,938,564 B2 | 9/2005 | Conrad et al. |
| 7,171,912 B2 | 2/2007 | Fraisse et al. |
| 7,171,913 B1 | 2/2007 | Conrad |
| 7,270,065 B2 | 9/2007 | Conrad |
| 7,317,988 B2 | 1/2008 | Johnson |
| 7,370,589 B2 | 5/2008 | Wilkerson et al. |
| 7,380,733 B2 | 6/2008 | Owenby et al. |
| 7,694,638 B1 | 4/2010 | Riewerts et al. |
| 7,916,022 B2 | 3/2011 | Wilcox et al. |
| 8,024,074 B2 | 9/2011 | Stelford et al. |
| 8,074,585 B2 | 12/2011 | Wilkerson et al. |
| 8,141,504 B2 | 3/2012 | Dean et al. |
| 8,322,293 B2 | 12/2012 | Wollenhaupt et al. |
| 8,336,470 B2 | 12/2012 | Rans |
| 8,371,239 B2 | 2/2013 | Rans et al. |
| 8,371,240 B2 | 2/2013 | Wollenhaupt et al. |
| 8,504,234 B2 | 8/2013 | Anderson |
| 8,504,310 B2 | 8/2013 | Landphair et al. |
| 8,517,230 B2 | 8/2013 | Memory |
| 8,600,629 B2 | 12/2013 | Zielke |
| 8,781,693 B2 | 7/2014 | Woodcock |
| 8,825,263 B1 | 9/2014 | Nelson, Jr. |
| 8,868,300 B2 | 10/2014 | Kocer et al. |
| 8,924,099 B2 | 12/2014 | Nelson, Jr. |
| 9,113,591 B2 | 8/2015 | Shivak |
| 9,226,442 B2 | 1/2016 | Grimm et al. |
| 9,820,431 B2 * | 11/2017 | Conrad ............... A01M 7/0092 |
| 9,918,426 B2 | 3/2018 | Grimm et al. |
| 10,058,023 B2 * | 8/2018 | Conrad .................. A01C 7/04 |
| 10,064,327 B2 * | 9/2018 | Conrad .................. A01C 7/06 |

(56) References Cited

U.S. PATENT DOCUMENTS

| | | |
|---|---|---|
| 10,111,415 B2 | 10/2018 | Kolb et al. |
| 10,306,824 B2 | 6/2019 | Nelson et al. |
| 10,440,878 B2 * | 10/2019 | Conrad ................ A01C 21/005 |
| 10,470,356 B2 * | 11/2019 | Rice .................... A01M 7/0092 |
| 10,492,357 B2 * | 12/2019 | Conrad ................... A01C 7/04 |
| 10,517,206 B2 * | 12/2019 | Wintemute ......... A01M 9/0092 |
| 10,694,655 B2 * | 6/2020 | Wintemute .......... A01C 21/005 |
| 2003/0226484 A1 | 12/2003 | O'neall et al. |
| 2004/0231575 A1 | 11/2004 | Wilkerson et al. |
| 2007/0193483 A1 | 8/2007 | Conrad |
| 2007/0266917 A1 | 11/2007 | Riewerts et al. |
| 2009/0308296 A1 * | 12/2009 | Senchuk ................ A01C 5/062 111/8 |
| 2010/0101466 A1 | 4/2010 | Riewerts et al. |
| 2010/0282141 A1 | 11/2010 | Wollenhaupt et al. |
| 2010/0282143 A1 | 11/2010 | Preheim et al. |
| 2010/0282144 A1 | 11/2010 | Rans et al. |
| 2010/0282147 A1 | 11/2010 | Wollenhaupt et al. |
| 2011/0035055 A1 | 2/2011 | Applegate et al. |
| 2011/0054743 A1 | 3/2011 | Kocer et al. |
| 2011/0296750 A1 | 12/2011 | Davis et al. |
| 2012/0010789 A1 | 1/2012 | Dulnigg |
| 2012/0042815 A1 | 2/2012 | Wonderlich |
| 2013/0061789 A1 | 3/2013 | Binsirawanich et al. |
| 2013/0061790 A1 | 3/2013 | Binsirawanich et al. |
| 2013/0085598 A1 | 4/2013 | Kowalchuk |
| 2013/0152835 A1 | 6/2013 | Stevenson et al. |
| 2013/0192503 A1 | 8/2013 | Henry et al. |
| 2013/0255670 A1 * | 10/2013 | Ott ........................ A61M 16/16 128/200.14 |
| 2014/0026792 A1 | 1/2014 | Bassett |
| 2014/0048002 A1 | 2/2014 | Grimm et al. |
| 2014/0183182 A1 | 7/2014 | Oh et al. |
| 2014/0252111 A1 | 9/2014 | Michael et al. |
| 2014/0263705 A1 | 9/2014 | Michael et al. |
| 2014/0263708 A1 | 9/2014 | Thompson et al. |
| 2014/0263709 A1 | 9/2014 | Kocer et al. |
| 2014/0277780 A1 | 9/2014 | Jensen et al. |
| 2014/0284400 A1 | 9/2014 | Hebbert et al. |
| 2015/0094916 A1 | 4/2015 | Bauerer et al. |
| 2015/0097707 A1 | 4/2015 | Nelson, Jr. et al. |
| 2015/0195988 A1 | 7/2015 | Radtke et al. |
| 2015/0334912 A1 | 11/2015 | Sauder et al. |
| 2016/0073576 A1 | 3/2016 | Grimm et al. |
| 2018/0049367 A1 | 2/2018 | Garner et al. |
| 2018/0177119 A1 | 6/2018 | Grimm et al. |
| 2018/0359909 A1 | 12/2018 | Conrad et al. |
| 2019/0059204 A1 | 2/2019 | Kowalchuk |
| 2019/0124907 A1 | 5/2019 | Kolb et al. |

FOREIGN PATENT DOCUMENTS

| | | |
|---|---|---|
| WO | 2014018717 A1 | 1/2014 |
| WO | 2013191990 A3 | 2/2014 |
| WO | 2015061570 A1 | 4/2015 |

OTHER PUBLICATIONS

Screenshot from http://www.amvacsmartbox.com/Portals/0/Guides/DropTubes/Drop%20Tube%20-%20John%20Deere%20-%20Reart%20Mount.PD, downloaded on Jul. 13, 2017 (1 Page).

European Application No. EP-14 85 5768.9, European Extended Search Report and Written Opinion of the European Searching Authority dated May 10, 2017 Attached to Pursuant to Rule 62 EPC and Cited References (92 Pages).

European Application No. EP-19 15 2958, European Search Report and the European Seach Opigion of the European Searching Authority dated May 28, 2019 (17 Pages).

Bayercropscience LP, Aztec 4/67% Granular Insecticide for Use in Smartbox System Only, dated Oct. 16, 2003, from https://www3.epa.gov/pesticides/chem_search/ppls/000264-00811-20031016.pdf, downloaded Oct. 31, 2019 (5 Pages).

U.S. Environmental Protection Agency, Notice of Pesticide: Registration, dated Feb. 10, 2009 from https://www3.epa.gov/pesticides/chem_search/ppls/005481-00562-20090210.pdf, downloaded Oct. 31, 2019 (11 Pages).

International Application No. PCT/US2019/46516, International Search Report and the Written Opinion of the International Searching Authority, or the Declaration dated Dec. 4, 2019 (14 Pages).

* cited by examiner

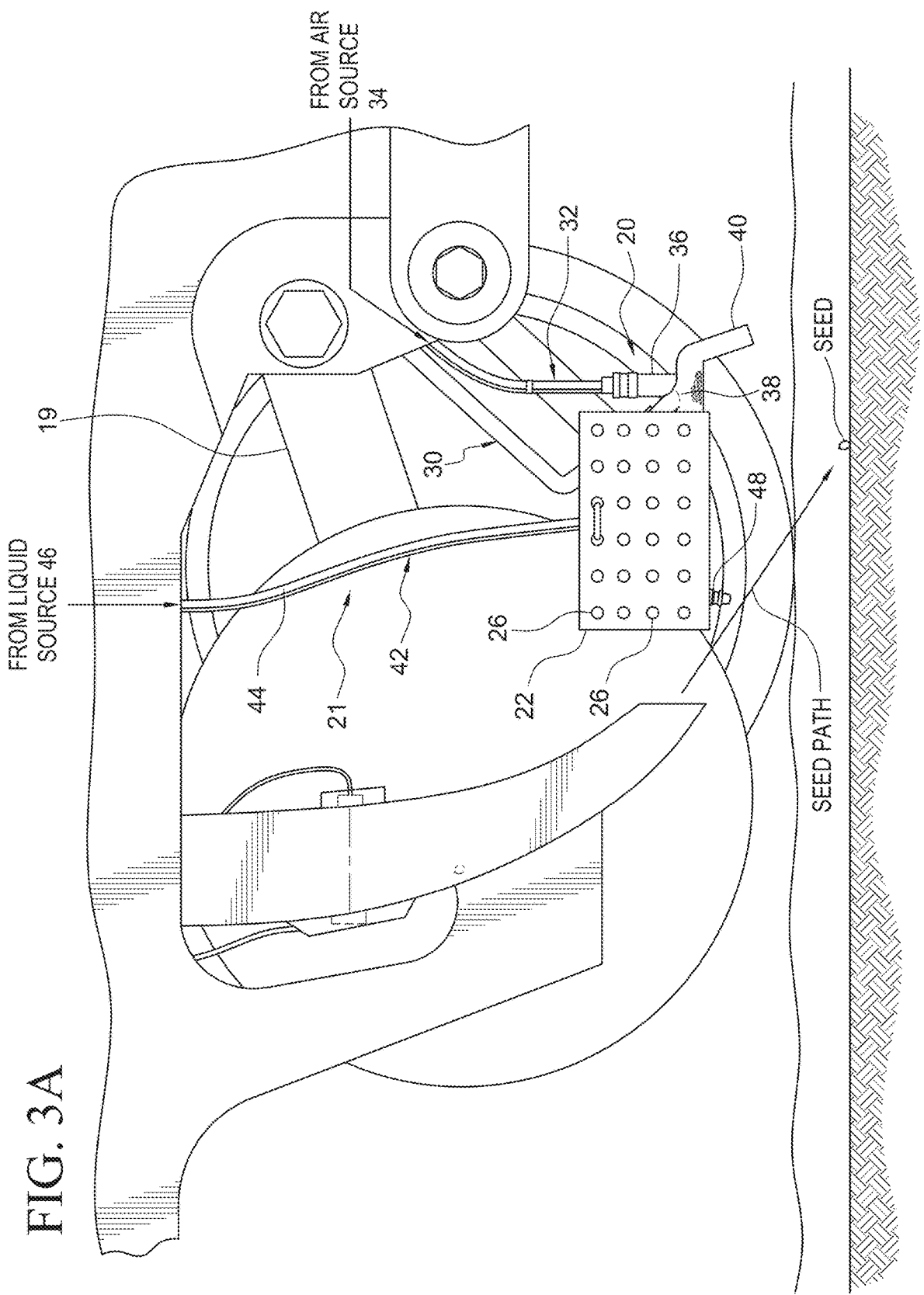

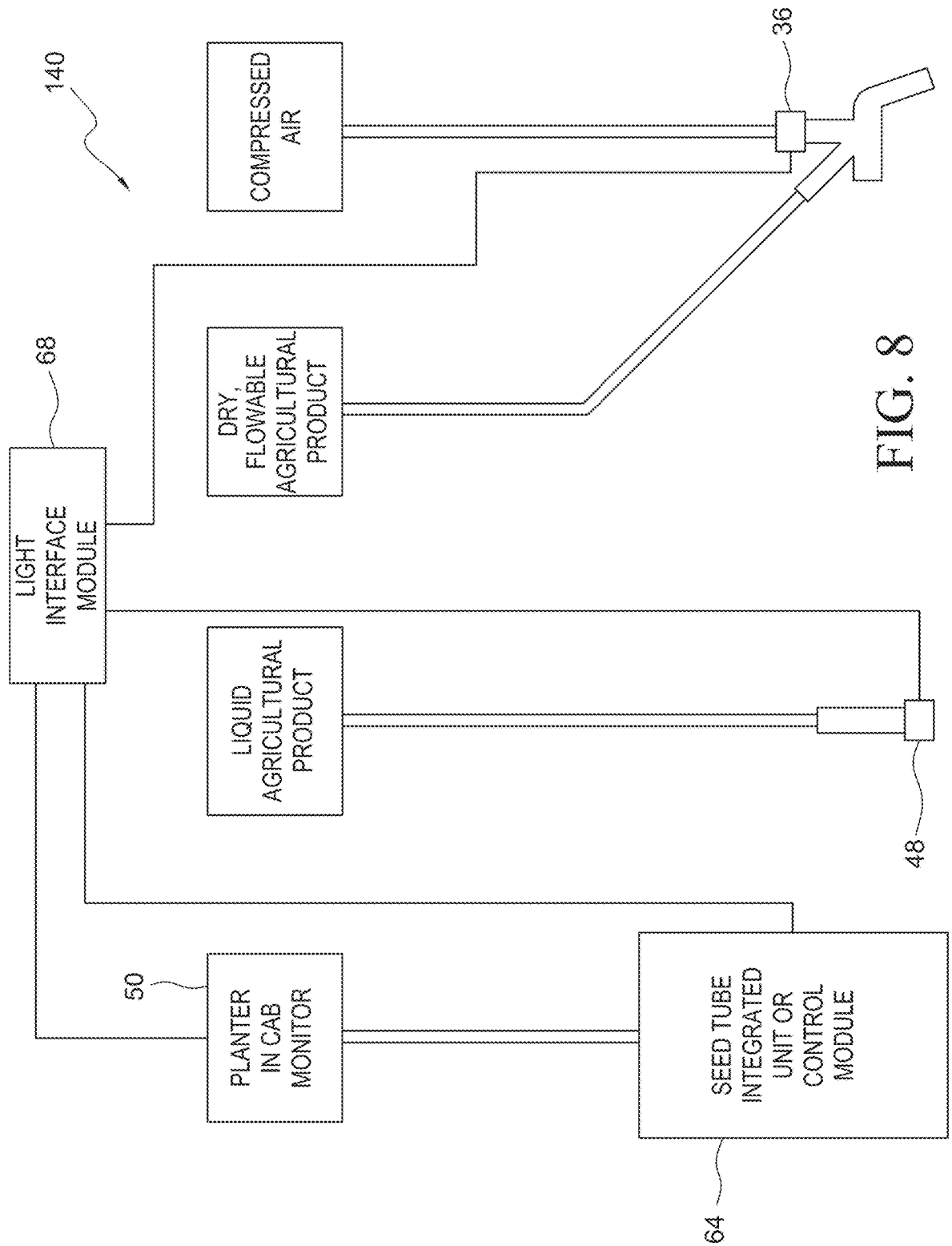

SYSTEM AND METHOD FOR DISPENSING MULTIPLE LOW RATE AGRICULTURAL PRODUCTS

CROSS REFERENCE TO RELATED APPLICATIONS

The present application is a continuation of U.S. application Ser. No. 16/112,660, filed Aug. 25, 2018, which is a continuation in part of U.S. application Ser. No. 16/107,374, filed Aug. 21, 2018, now U.S. Pat. No. 10,251,337, which is a division of U.S. application Ser. No. 15/190,652 filed Jun. 23, 2016, now U.S. Pat. No. 10,064,327, which claims benefits of a U.S. Provisional Patent Application No. 62/188,555 filed Jul. 3, 2015.

U.S. application Ser. No. 16/112,660 filed Aug. 25, 2018 is a continuation in part of U.S. application Ser. No. 15/981,289 filed May 16, 2018, which claims benefit of U.S. Provisional Application No. 62/508,145 filed May 18, 2018, and is a continuation in part of U.S. application Ser. No. 15/614,547, filed Jun. 5, 2017, which is a continuation in part of U.S. application Ser. No. 14/521,908, filed Oct. 23, 2014, now U.S. Pat. No. 9,820,431, which is a continuation in part of patent application Ser. No. 14/468,973, filed Aug. 26, 2014, and claims benefits of a U.S. Provisional U.S. Application No. 61/870,667, filed Aug. 27, 2013, and claims benefits of U.S. Provisional U.S. Application No. 61/895,803, filed Oct. 25, 2013, and said U.S. application Ser. No. 15/614,547 claims benefits of a U.S. Provisional Application No. 62/346,377, filed Jun. 6, 2016.

U.S. application Ser. No. 16/112,660 filed Aug. 25, 2018 is a continuation in part of U.S. application Ser. No. 15/816,792, filed Nov. 17, 2017, which is a continuation of U.S. application Ser. No. 14/521,908, filed Oct. 23, 2014, now U.S. Pat. No. 9,820,431, which is a continuation in part of U.S. application Ser. No. 14/468,973, filed Aug. 26, 2014, which claims benefits of U.S. Provisional Application No. 61/870,667, filed Aug. 27, 2013, and said U.S. application Ser. No. 14/521,908 claims benefits of U.S. Provisional Application No. 61/895,803, filed Oct. 25, 2013, and claims benefits of a U.S. Provisional Application No. 62/048,628, filed Sep. 10, 2014.

U.S. application Ser. No. 16/112,660, filed Aug. 25, 2018 is a continuation in part of U.S. application Ser. No. 15/614,547, filed Jun. 5, 2017, which is a continuation in part of U.S. application Ser. No. 14/521,908, filed Oct. 23, 2014, now U.S. Pat. No. 9,820,431, entitled, filed Oct. 23, 2014, now U.S. Pat. No. 9,820,431, which is a continuation in part of U.S. application Ser. No. 14/468,973, filed Aug. 26, 2014.

U.S. application Ser. No. 16/112,660, filed Aug. 25, 2018, which is a continuation in part of U.S. application Ser. No. 15/208,605, filed Jul. 13, 2016, now patent Ser. No. 10/058,023.

The entire contents of Ser. No. 16/112,660, 16/107,374, 15/190,652, 62/188,555, 15/981,289, 62/508,145, 15/614,547, 14/521,908, 14/468,973, 61/870,667, 61/895,803, 62/346,377, 15/816,792, 62/048,628, 15/208,605 are each hereby incorporated by reference.

BACKGROUND OF THE INVENTION

1. Field of the Invention

The present invention relates generally to agricultural product dispensing systems; and, more particularly to systems for dispensing multiple low rate agricultural products.

2. Description of the Related Art

There are several ways to dispense at-plant liquid and/or granule products in or near the furrow while planting. For, example, commercial devices for dispensing low-rate, in-furrow liquid products while planting are not suitable for newer planters that operate at speeds which exceed 5 miles per hour while distributing planting seed into the seed furrow. The physical design and liquid placement of these commercial devices are neither suitable for dispensing very low rates (one-half gallon or less per linear acre, on crop rows planted 30 inches apart, or less than about 3.7 fluid ounces/1,000 row feet) of continuously applied liquid agricultural product per acre in a manner that enables the product to deliver an efficacious result, nor are they capable of synchronizing the delivery of the liquid with the seed, such that an ultra-small dose of liquid is delivered in very close proximity to the seed, with as much as 90% (or more) of the space or area between the seeds remaining untreated with the liquid so applied. As will be discussed below, the present invention provides the combination of continuous stream, low rate liquid application technology, in concert with pulsed delivery of the liquid to synchronize delivery of the liquid with the seed resulting in an untreated space that remains between each seed so that the total applied liquid volume per acre can be reduced by as much as 90% versus currently available in-furrow liquid application systems.

For example, the default synchronized or pulsed dispensing rate for one conventional commercial system is 5 gallons per acre at 5 MPH, with a resultant treated strip of approximately 3 inches in length being applied with each pulse of applied liquid. In such a situation the planted seed is placed within this 3 inch treated strip. This correlates to enabling the liquid application process to be turned on and off (pulsed), using a time interval of approximately 30 milliseconds. In order to reduce the total quantity of liquid chemical applied per acre, it is desirable to be able to synchronize delivery of the liquid chemical with delivery of the seed, while the planter is operating at speeds greater than 5 MPH, while limiting the area or length of treated soil to a strip which may be approximately 1 inch in length, with a treated strip of soil always being in close proximity (i.e. within ½ inch) to each planted seed. To enable application of such a low rate in such close proximity with the seed requires the liquid to be pulsed at a time interval of about 3 milliseconds. As will be discussed below, the invention described herein can efficaciously apply continuous low rate liquids at ½ gallon per acre or less, while the planter is being operated at speeds greater than 5 MPH, and so can be used with newer, high-speed planters. Reducing the total volume of continuously applied liquid to ½ gallon per linear acre corresponds to about 17% of the somewhat low rate continuous liquid application systems that are currently available. Current low-rate liquid pulsing/synchronization technology cannot apply such low rates due to the inability of commercially available agriculture product pulsing valves/devices to operate at the high speed/short time interval required, and due to the inability to synchronize the spray pulse with seed placement such that the seed and liquid are in close enough proximity to ensure efficacious results from the applied liquid.

In spite of the desirability of being able to apply an ultra-low-rate of a liquid, in-furrow product while planting at high speed, the configuration of current planting systems that use pulsed liquid application systems have major problems/limitations. As used herein the term "ultra-low-rate," as applied to liquids, refers to a rate below 1.0 fluid ounces per 1000 row feet. The term "low rate," as apply to liquids, refers to a rate below 3.7 fluid ounces per 1000 row feet. To meet the high-speed, low rate objective, the actual pulsing device must be closer to the seed area than currently available designs. For continuous application no pulsing device is required. Therefore the application device can be located in any position relative to the seed area. Furthermore, the area available for the pulsing device to be mounted closer to the landing point of each seed in the seed trench or furrow is small, relative to the available space on the planter where currently available pulsing devices are mounted. Current pulsed-delivery orifices or spray tips are mounted from 6 to 40 inches from the pulsing device. When applying liquid products at very low rates, i.e. ultra-low rates, with high speed pulsing, the amount of fluid between the pulsing device (valve) and orifice limits the speed of operation because the fluid has inertia and the line has to go from low pressure to dispensing pressure very quickly. Also, to prevent dripping during periods of very low pressure or when pressure is zero, a check valve may be required. Check valves used in currently available in-furrow application equipment are not designed to operate at the high speeds that are required for high speed planting, nor are they designed to operate at the frequent on/off cycles required at high speeds. Therefore, check valve placement and operational limitations negatively affect the ability to accurately synchronize application of liquid products at low and ultra-low rates in very close proximity with planting seed when planting at high speed, even though the presence of check valves on currently available application equipment increases the range of operating limits of systems so equipped, versus similar systems without check valves. Also, as is the case with the physical size of currently available pulsing devices, the physical size of most check valves prevents close mounting to the seed release area, i.e., the area where the seed exits the seed transport mechanism, prior to placement in the seed furrow.

Furthermore, when farmers try to apply both liquid and dry (e.g. granule) agricultural products during the same planting operation or pass, the liquid product frequently dampens, and therefore interferes with the flowability of the dry product, which results in plugged or reduced-flow dry product placement tubes. Anything that causes a less than intended rate of dry or liquid product to be applied within the intended area of close proximity with each seed can contribute to reduced efficacy of the product(s) being applied. As will be disclosed hereinafter, the inventive concepts of the present invention resolves this issue.

U.S. Pat. No. 6,938,564 uses a brush that collects the granules at the end of the seed tubeand when the seed comes down the tube it pushes open the brush and dispenses the chemical with the seed. The '565 system works fine for speeds up to about 5 MPH and populations of about 32,000 seeds per acre. However, if one attempts to operate the '564 system at speeds greater than 5 MPH, the exit speed of seed through the discharge opening of the delivery tube can be restricted by the brush, while the entry speed of seeds into the same delivery tube at a position above the brushes is not restricted. When seed enters the delivery tube at a rate that's faster than the discharge rate, blockage of the seed delivery tube can occur, resulting in reduced plant populations and a corresponding reduction in crop yield. Additionally, when operating the '564 system at speeds greater than 5 MPH, product synchronization is adversely affected, as a consequence of inadequate time for the brushes to collect an adequate quantity of product granules before the next seed passes through the brush, causing the brush bristles to flex and the product granules to be evenly synchronized in close proximity with each planted seed. The result can be a less than efficacious dose rate of granules being applied in close proximity with the seed, because a portion of the intended dose rate gets distributed in the space between the seeds as a consequence of the brush bristles' inability to flex, catch, and hold the chemical granules as quickly as is required when operating at speeds greater than 5 MPH. In essence, synchronization quality is diminished when the '564 system is operated at speeds greater than 5 MPH because granule leakage past the brushes occurs.

U.S. Pat. No. 7,270,065 discloses use of an electrical mechanical valve to dispense the chemical granules. The '065 patent addresses some of the problems inherent with the '564 patent. Presently, many corn planters have air compressors on them. The '065 patent introduces the option of using an air valve to blow the granules, versus requiring the seed to pass through the brush on which product granules are collected during the interval of time between the passage of seeds.

Over the past decade, planting and chemical dispensing systems for dispensing seed and insecticides, herbicides, fungicides, nutrients, plant growth regulators, or fertilizers, have made the handling of seed and chemical liquids or granules less hazardous to the agricultural worker by providing closed container systems, such as those described in U.S. Pat. Nos. 5,301,848 and 4,971,255, incorporated by reference herein and the SmartBox® Dispensing System (hereinafter "SmartBox Dispensing System"), marketed by AMVAC Chemical Corporation, a division of American Vanguard Corporation. Briefly, as described in U.S. Pat. No. 5,301,848, access to and from a container in a closed container system is available through a single opening in the bottom wall of the container, offering distinct advantages over an open-top, non-removable container design in an open container system.

Closed container systems provide a removable container, which is pre-filled with the chemical or toxic materials such as insecticides, fertilizers, herbicides and other pesticides; or other agricultural products, thereby eliminating the need to open and pour bags of chemical products into storage hoppers. Since the closed container system is largely not open to the air, agricultural workers have less opportunity to come into contact with the chemical products, thereby reducing skin and inhalation exposure to the hazardous chemicals.

At the present time, products that are applied in-furrow while planting include nematicides for the treatment of nematodes; insecticides for the treatment of insects; herbicides for the control of weeds; fungicides for the control of diseases; plant health/growth stimulant products for improving plant health; nutrients for improving plant health and nutrition, etc. There is research being conducted to develop additional in-furrow products that utilize living/biological micro-organisms, amino acids, proteins, peptides, and gene "switches", such as the developing area of RNA silencing or interference gene technology, etc.

Additionally, an alleged relationship between the use of at-planting applied neonicotinoid insecticides and a corresponding decline in the overall honeybee population has been reported. It is believed that air vacuum planters exhaust insecticide dust from planting seed that was treated with neonicotinoid insecticide prior to the seed being loaded into the planter, and that the dust from the same is adversely affecting the population of honeybees. Honeybees are an essential element of the plant pollination process for many crops, so a decline in honeybee populations can potentially reduce overall crop yields Insecticide dust from pre-treated seed can be eliminated if synchronized, in-furrow delivery of those same insecticides while planting proves to be an economically and efficacious alternative.

Today, most in-furrow granular products are dispensed or applied at a rate of more than three ounces per thousand feet of row, while most liquid products are applied at rates of more than 3.7 fluid ounces per thousand feet of row. In-furrow application rates of less than three dry ounces per thousand row feet, or less than 3.7 fluid ounces per thousand row feet, require special techniques and special equipment in order to deliver efficacious results. As will be disclosed below, the present invention addresses these needs.

Traditionally, systems for in-furrow granule placement use a plastic hose and metal bracket to establish the positioning of the granules into the furrow. Wind and the angle of field slope can affect product placement. Because they are placed behind the depth wheels on the planter, the brackets that establish the position of the are subject to being misaligned by coming into contact with crop residue, clods, and other field issues such as ditches and furrows. Also, since the furrow closure is determined by soil conditions, the furrow may be closed by the time the chemical (i.e. agricultural product) tube applies the chemical to the furrow. When the point of product discharge is placed behind the depth wheels, wind can blow the product off target under the windy conditions that are prevalent during planting time. With conventional banding equipment, product is frequently placed on the downhill side of the row in fields with substantial slope that runs in a somewhat perpendicular direction from the direction of the rows. Originally installed granular product banding equipment from planter manufacturers is often too wide and provides little to no protection from the wind, which may allow product to be blown away from the desired application zone.

U.S. Pat. No. 9,820,431, issued to present inventor L. M. Conrad, discloses a process and system for accurately applying low-rate, in-furrow dry/granular agricultural products. The '431 patent addresses and resolves several of the problems associated with obtaining efficacious results when applying in-furrow products at low rates while planting.

US Pat. Publication US 2018/0000070, published on Jan. 4, 2018, to FMC Corporation, discloses foamable formulations of agriculturally active ingredients, as well as methods for using them. The formulations allegedly "allow improved delivery of active ingredients by the ability to deliver high amounts of active ingredient with a low volume of formulation used." The '070 publication discloses application of products below 1 gallon per acre input. In other words, the active ingredient plus carrier is below 1 gallon per acre input. The FMC foam system expands that active ingredient plus carrier by 15 to 50 times the input. Therefore, the amount of agricultural product dispensed into the furrow is actually many gallons (i.e. on the order of 15 to 50 gallons) when the combined volume of liquid plus air in the foamed product is accounted for.

SUMMARY OF THE INVENTION

In one aspect, the present invention is embodied as a system for dispensing multiple low rate agricultural products that includes a multiple low rate agricultural (MLRA) product application device configured to cooperate with a planting equipment monitor assembly positioned to sense a seed being discharged from high speed planting equipment.

In a preferred embodiment, each MLRA product application device comprises a common housing for a number of low rate agricultural product input assemblies. Thus, the present invention mitigates the issue discussed above regarding liquid interference with the dry, flowable product placement tube and resultant plugging of it.

In one aspect, the present invention is embodied as a system for dispensing multiple low rate agricultural products, including an agricultural product metering system, a number of agricultural product tubes, and an agricultural product metering system. The agricultural product metering system is operably connected to sources of low rate agricultural products. The agricultural product tubes are operatively connected to the agricultural product metering system. The agricultural product metering system is configured to dispense liquid low rate agricultural products at a low rate defined as below 3.7 fluid ounces per 1000 row feet.

In a preferred embodiment the agricultural product metering system includes a syringe-based pump system.

In a preferred embodiment the system for dispensing multiple low rate agricultural products includes a seed sensing device configured to sense placement of seed from a planter; a pulsing system and an agricultural product metering system. The pulsing system is operatively coupled to output ends of agricultural product tubes and to the seed sensing device and is configured to synchronize the placement of low rate agricultural products relative to the placement of seed. The agricultural product metering system can also be configured to dispense liquid agricultural products an ultra-low-rate defined as below 1.0 fluid ounces per 1000 row feet.

In one aspect, the present invention is embodied as a system for dispensing multiple low rate agricultural products with seed. The system includes a seed sensing device; an agricultural product metering system; agricultural product tubes and a pulsing system. The seed sensing device is configured to sense placement of seed from a planter. The agricultural product metering system is operably connected to sources of low rate agricultural products. The agricultural product tubes are operably connected to the agricultural product metering system. The pulsing system is operatively coupled to output ends of the agricultural product tubes and to the seed sensing device and is configured to synchronize the placement of low rate and/or ultra-low rate agricultural products relative to the placement of seed.

In one embodiment the seed sensing device is configured to sense placement of seed from a planter configured to operate at a high planter speed, the high planter speed being defined as greater than 5 mph. In other embodiments, the seed sensing device is configured to sense placement of seed from a planter configured to operate at a planter speed in a range of about 2 mph to 7 mph. In some embodiments the agricultural product metering system is configured to dispense dry, flowable low rate agricultural products at a low rate defined as below 3 ounces per 1000 feet of row. In some embodiments the agricultural product metering system is configured to dispense liquid low rate agricultural products at a low rate defined as below 3.7 fluid ounces per 1000 row feet. In some embodiments the agricultural product metering system is configured to dispense liquid agricultural products at an ultra-low-rate defined as below 1.0 fluid ounces per 1000 row feet. In some embodiments the pulsing system is configured to provide the synchronized the placement of low rate and/or ultra-low rate agricultural products in close proximity with an individually placed seed or seed grouping, adjacent to an individually placed seed or seeds, or between individually placed individual seeds or groups of seed, as desired.

In one aspect the present invention is embodied as a system for dispensing a liquid low rate agricultural product, including an agricultural product metering system and at least one agricultural product tube. The agricultural product metering system includes a syringe-based pump system operably connected to a source of liquid low rate agricultural product. The agricultural product tube is operatively connected to the agricultural product metering system. The agricultural product metering system is configured to continuously apply the liquid low rate agricultural product at a low rate defined as below 3.7 fluid ounces per 1000 row feet.

In one aspect the present invention is embodied as a system for dispensing a liquid ultra-low rate agricultural product, including an agricultural product metering system and at least one agricultural product tube. The agricultural product metering system includes a syringe-based pump system operably connected to a source of liquid ultra-low rate agricultural product. The agricultural product tube is operatively connected to the agricultural product metering system. The agricultural product metering system is configured to apply the liquid low rate agricultural product synchronized with placement of seed from a planter, at an ultra-low rate defined as below 1.0 fluid ounces per 1000 row feet.

As noted above, the FMC '070 publication discloses application of liquid products at below 1 gallon (128 fluid ounces) per linear acre. (There are 17,424 linear row feet per acre when the rows are spaced 30 inches apart; 128 fluid ounces per 17,424 row feet is equal to 7.346 fluid ounces per 1,000 row feet.) However, the present patent application, on the other hand relates to efficacious liquid application rates of less than 64 fluid ounces (3.673 fluid ounces per 1,000 row feet.) output per linear acre. As noted previously, the actual output volume of the '070 FMC system is 15 to 50 times the input, in other words, many gallons of output per acre. Furthermore, the FMC '070 system discusses placement in a continuous stream, which means the liquid is applied in all the spaces between the planted seeds. The present invention, on the other hand, provides the ability to apply liquid product in a continuous stream or in a pulsed process that synchronizes delivery of the liquid with the seed, resulting in significant strips of untreated soil in the furrow in the space between the seeds. The FMC '070 system mixes products before application. The present invention, on the other hand, provides for the simultaneous yet individual application of multiple agricultural products, even potentially incompatible products, during a single planting operation, while enabling individual products, dry and/or liquid, to be precisely placed at the desired locations, for example on the seed, between the seed, and in or adjacent to the seed furrow. Furthermore, since the FMC system is reliant on the foaming process, the potential ingredients are limited to products that can be formulated to deliver efficacious results in a foamed state.

As can be understood by the present disclosure, during a single planter pass, various combinations of products from multiple containers can be applied with this technology. In another aspect, the present invention is embodied as a system for dispensing multiple agricultural products. The system includes a Multiple Low Rate Agricultural (MLRA) product application device configured to cooperate with a planting equipment monitor assembly that is positioned to sense seed being discharged from high speed planting equipment.

The application rate range of the systems of the present invention provide for a convenient package for handling and shipping. The containers are smaller and lighter than presently used containers. Manufacturing and shipping costs are reduced, as is the environmental footprint. Furthermore, less volume of product results in reduced storage and handling requirements throughout the distribution channel and for the grower.

In some embodiments the product containers are rigid. In some embodiments the product containers may be disposable. (If disposable product containers are used, the contents of the disposable containers are transferred to or are utilized in conjunction with one or more configurable, rigid product reservoirs.)

The system of the present invention utilizes precision placement equipment, typically including placement tube assemblies. In one embodiment, each placement tube assembly is mounted in a manner that enables placement of the applied product(s) in-furrow, between the depth wheels of a depth control wheel assembly of the planter. In some embodiments, the precision placement equipment comprises banders. In some embodiments, the bander is mounted behind a depth control wheel assembly and forward of the planter's closing wheel assembly. In some embodiments the bander includes a wind screen positioned thereon.

Some products need to be applied adjacent to the seed trench or furrow, instead of being applied directly into the same furrow where the seed is positioned by the planter. The reason for placing some products beside or adjacent to the furrow is because some products cause a phytotoxic or adverse reaction by the seed or seedling. In such instances, agronomic performance is improved if the seed can germinate and begin to grow without being in direct contact with the applied product, recognizing that overall agronomic performance will be improved versus non-use of the product, if the seedling roots can quickly grow into a zone where the applied product is available as a consequence of having been precision-placed during the planting process. In some scenarios, it might be preferable to place the product in the seed furrow, but synchronized in association with the delivery of each seed such that the seed is placed into a location where the product was not applied. Thus, in some situations, treated strips of product occur in-between each seed, thereby allowing the newly germinated seeds to extend their roots into a product treatment zone that exists or begins in the seed furrow, versus having to reach a product treatment zone that originated from precision placement of the product in a position that is adjacent to the row. Precision placement of multiple products, where products are placed in-furrow, or adjacent to the furrow, with, for example, one or more products being applied in furrow, while one or more additional products are applied adjacent to the row, on one or both sides of the row, can be accomplished with dry and liquid products during a single pass of the planter.

In certain embodiments, the memory associated with the cartridge is part of an RFID (Radio Frequency Identification) tag. In a number of embodiments, the current user identity data is read from a user identification source associated with the dispensing equipment, such as an authorization code to enable dispensing by the dispensing equipment. In some embodiments, each entity that takes possession of the cartridge is tracked, and the memory associated with the cartridge is updated with entity possession data. In one embodiment, the method further includes designating a cartridge as the cartridge to be used by or on behalf of the specific user for specific product such as selected agricultural product.

In some embodiments, the method includes repeatedly detecting, at least during dispensing of the product, changes in geographic location of the cartridge, and repeatedly entering and updating geographic information for sequential geographic locations with as-applied product data at those geographic locations into the memory associated with the cartridge. An as-applied map is generated in certain embodiments to record as-applied quantities of product dispensed at the sequential geographic locations at a target area. In one embodiment, the as-applied map is compared to a prescriptive map to generate a difference map indicating at least differences greater than a selected error amount, such as deviations greater than two percent or three percent from prescribed values, between prescribed information and as-applied information relating to quantities and type of product actually dispensed at the sequential geographic locations at the target area. In another embodiment, the as-applied product data is compared to prescriptive application data to generate an error message for differences greater than a selected error amount between prescribed information and as-applied information relating to quantities and type of product actually dispensed at the sequential geographic locations at the target area.

This invention further features a system and method that automatically monitors product use data, such as the type and amount of product suitable for at least one of agricultural use and horticultural use that is stored in and dispensed from at least one cartridge over time and/or by geographic location. Monitored data are stored in memory such as a tag on the cartridge and, in certain embodiments, are transmitted to a server and/or an Input/Output device such as a tablet or other mobile device, for storage, aggregation, and analysis. The cartridge may be authenticated before being authorized for use in dispensing the product. The cartridge may be refilled automatically with only the proper type and amount of product needed to fill the cartridge. To ensure that only the proper type of product can be introduced into the cartridge during the refilling process, authentication is conducted in certain embodiments for both the cartridge and the container from which the refill contents will be dispensed. The system for dispensing the contents of the cartridge may be calibrated automatically based a product parameter such as on the weight and/or the bulk density (or liquid viscosity) of the product in the cartridge. Data may be aggregated from a plurality of cartridges automatically.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3A is an enlarged side view of a portion of the planter depicted in FIG. 2, showing a seed dropped in the furrow.

FIG. 8 is a simplified schematic illustration of the system for dispensing multiple low rate agricultural products, of the present invention.

The same elements or parts throughout the figures of the drawings are designated by the same reference characters, while equivalent elements bear a prime designation.

DETAILED DESCRIPTION OF THE INVENTION

Figure 1:
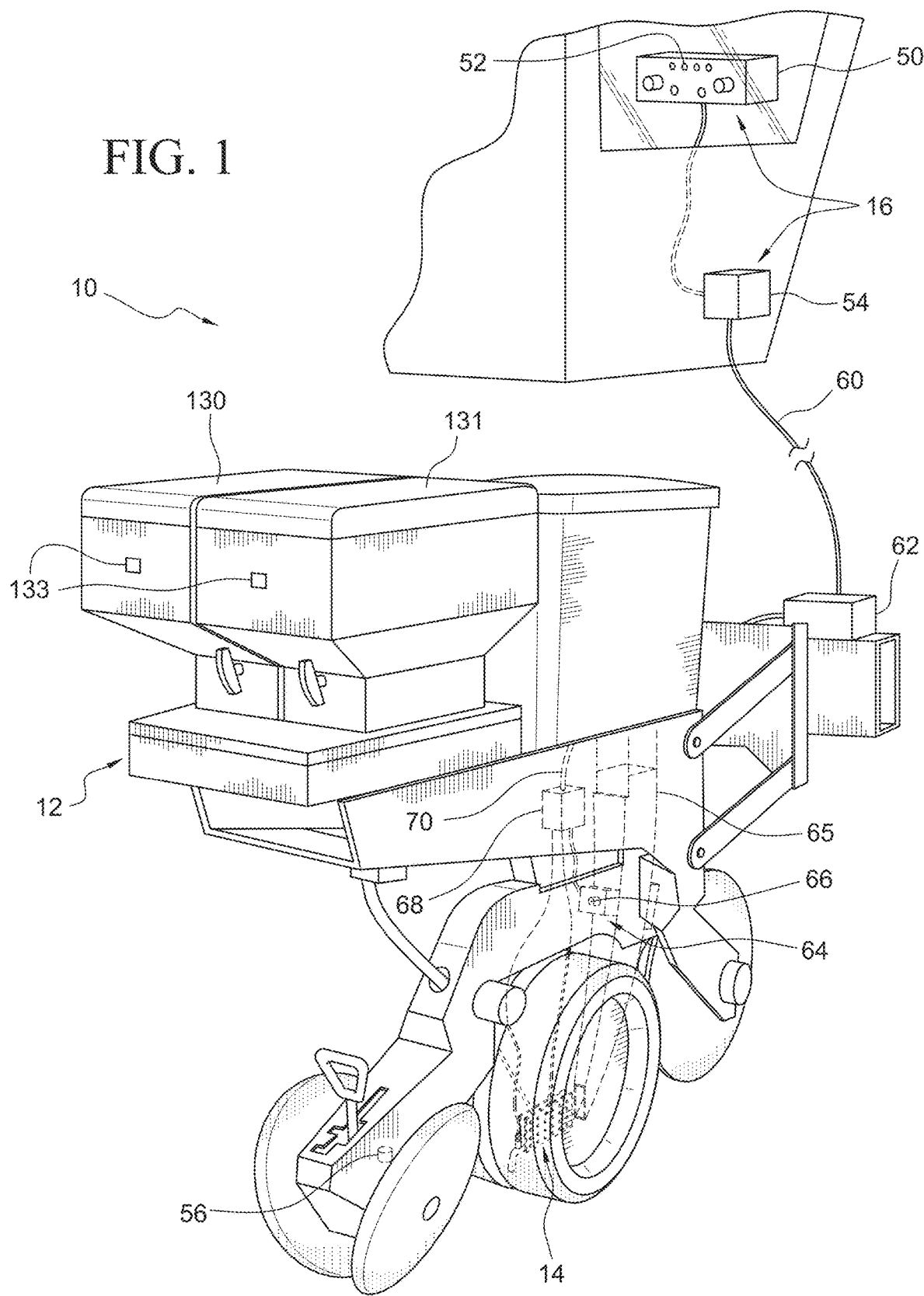
FIG. 1 is a perspective illustration of a planter equipped with a system for dispensing multiple low rate agricultural products in accordance with the principles of the present invention.
Figure 2:
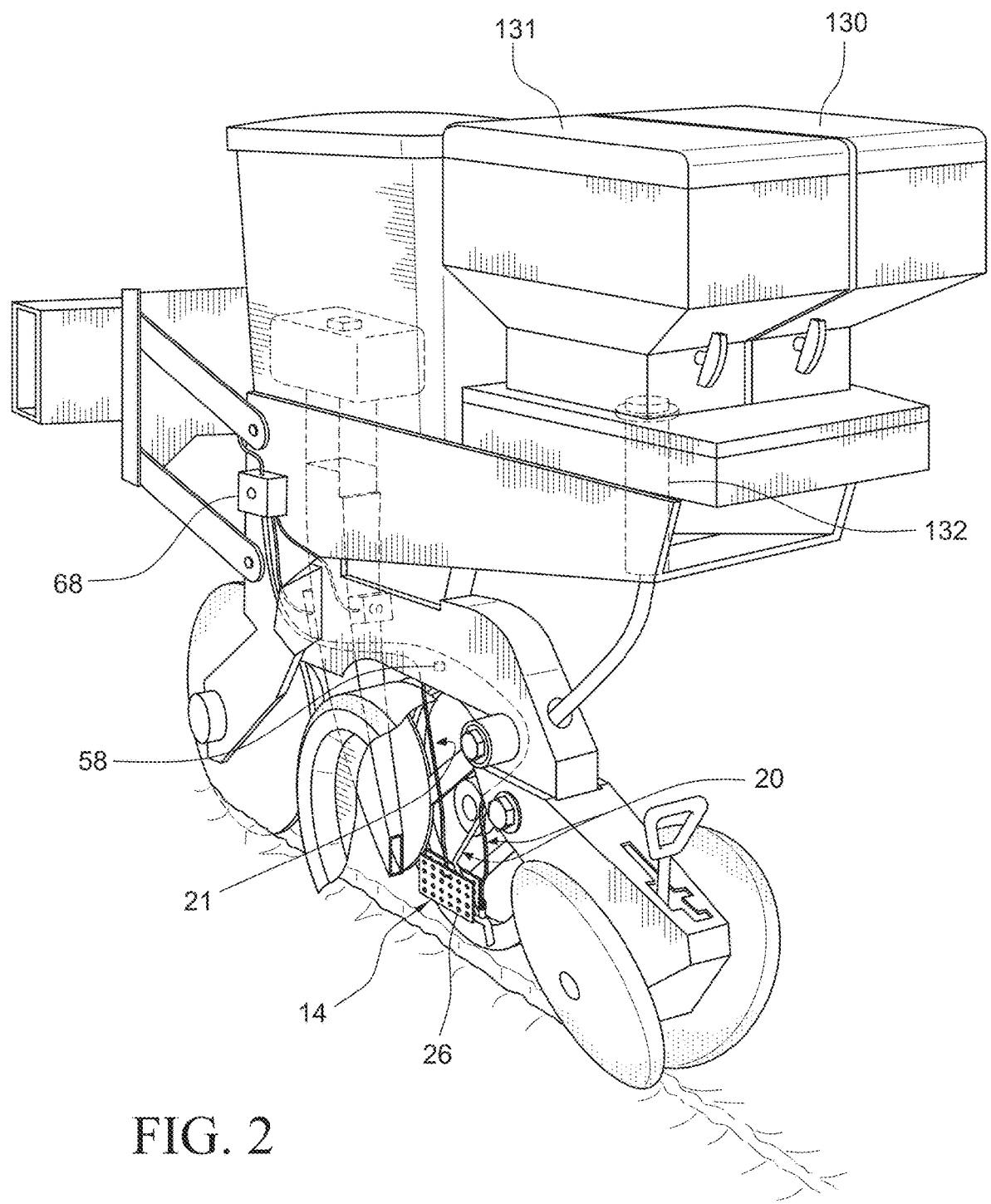
FIG. 2 is another perspective illustration of the planter of FIG. 1, partially broken away to reveal the multiple low rate agricultural product application device of the present invention.
Figure 3B:
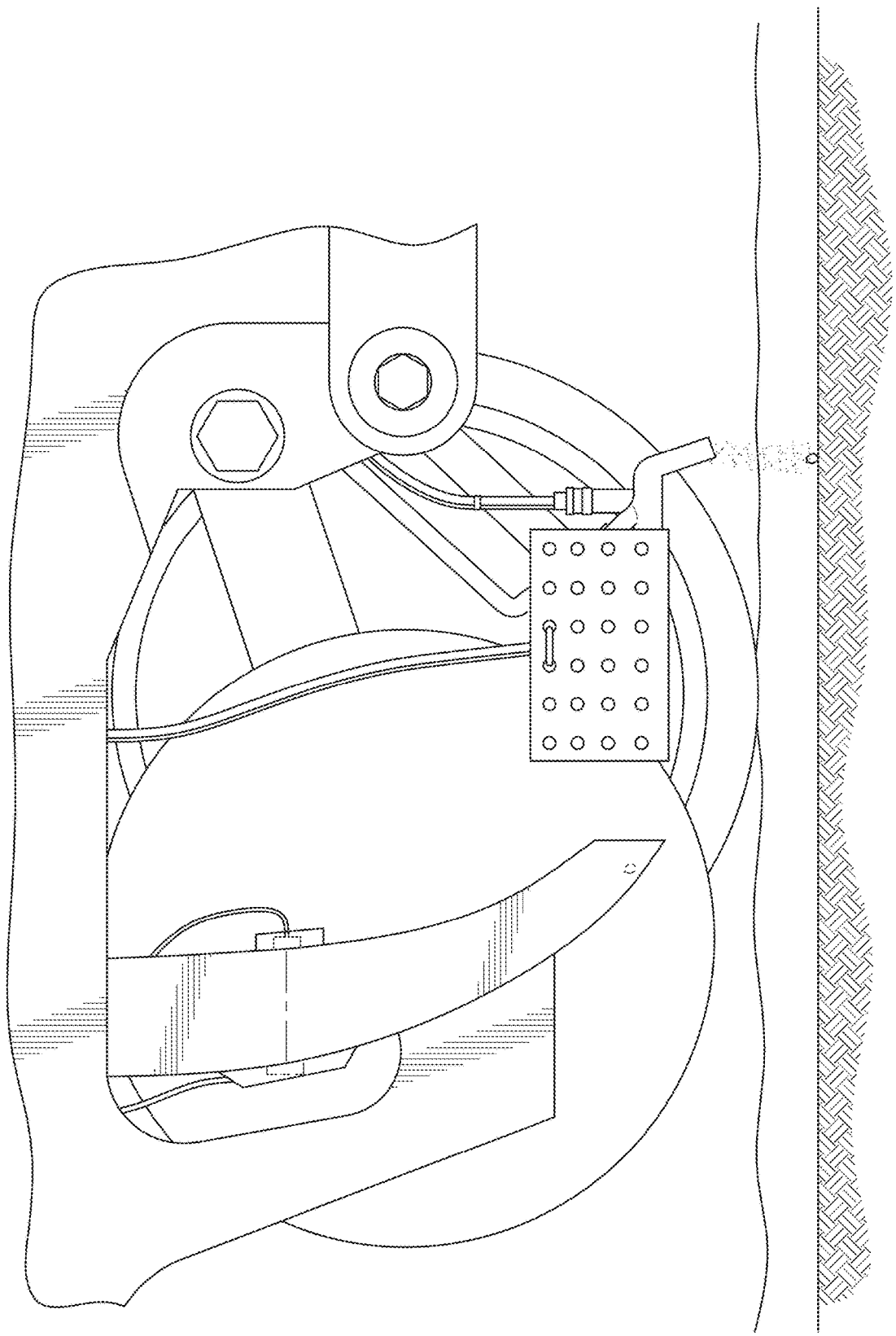
FIG. 3B shows dry, flowable agricultural product being applied.
Figure 4:
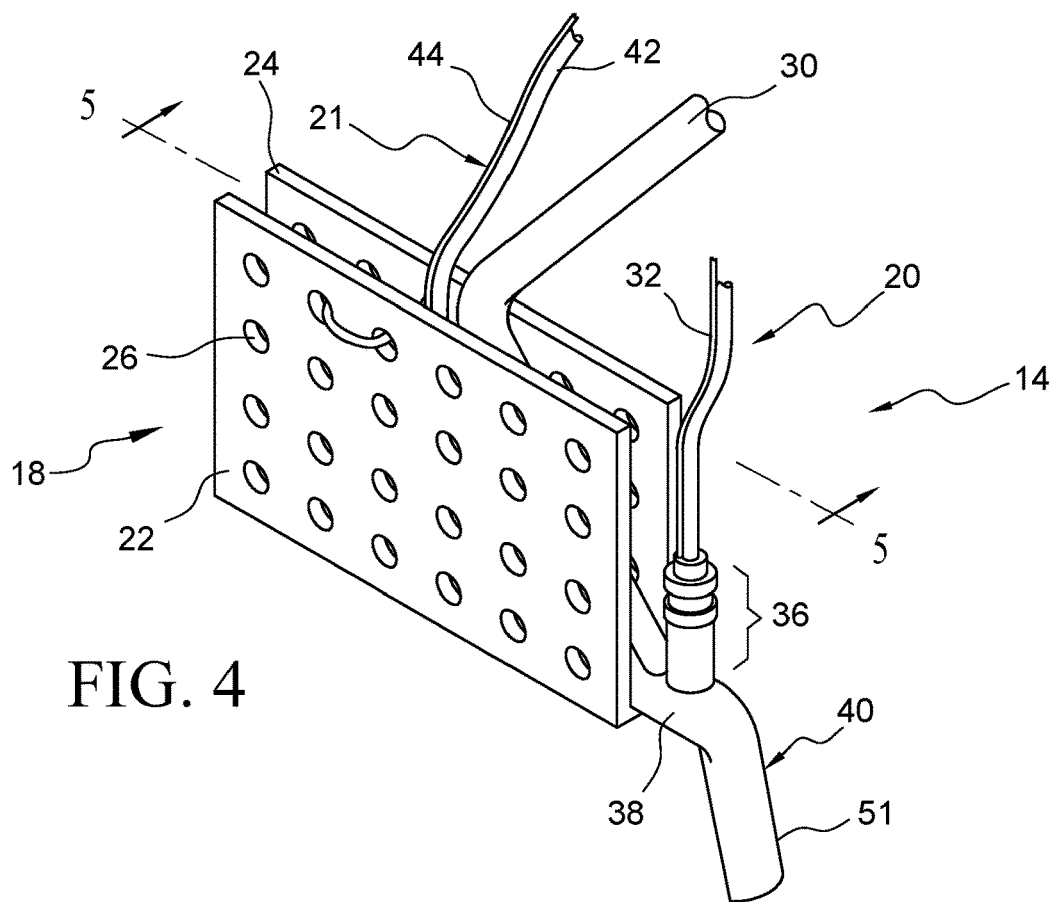
FIG. 4 is an enlarged perspective view of the Multiple Low Rate Agricultural (MLRA) product application device of the present invention.

Referring now to the drawings and the characters of reference marked thereon, FIGS. 1 and 2 show a simplified diagram of a system for dispensing multiple low rate agricultural products, designated generally as 10, positioned on a planter 12. The system 10 includes a Multiple Low Rate Agricultural (MLRA) product application device 14 configured to cooperate with a planting equipment monitor assembly 16 (i.e. seed sensing device) positioned to sense a seed being discharged from planting equipment, i.e. planter 12.

The MLRA product application device (i.e. "aiming device") 14 includes a common housing 18 for a plurality of low rate agricultural product input assemblies 20, 21. As will be discussed in more detail below, the low rate agricultural product input assemblies 20, 21 have exit ports supported by the common housing 18.

Referring now to FIGS. 3A, 3B, 4, and 5, each MLRA product application device 14 includes two plates 22, 24 securely supported in a spaced apart position. The plates 22, 24 preferably include mounting holes 26 that provide adjustment of the low rate agricultural product input assemblies 20, 21 for desired prescriptive discharge.

The seed sensing device 16 is particularly adapted to sense placement of seed from a planter configured to operate at a high planter speed. As defined herein a "high planter speed" is greater than 5 mph. However, the seed sensing device can optionally be used to sense placement of seed from a planter configured to operate at slower planter speeds, for example in a range of about 2 mph to 5 mph.

One type of low rate agricultural product input assembly is a liquid agricultural product input assembly 21. Typical liquid agricultural products may include, for example, synthetic or biological insecticides, fungicides, nematicides, inoculants, herbicides, fertility products, etc. Another type of low rate agricultural product input assembly 20 is a dry, flowable agricultural product input assembly 20. Typical dry, flowable agricultural products may include, for example, synthetic or biological insecticides, nematicides, inoculants, herbicides, fungicides, fertilizers and other agricultural products. Both liquid and dry agricultural products also may include growth hormones, growth promotion products, and other products for enhancing crop production.

The dry, flowable agricultural product input assembly 20 includes a dry, flowable agricultural product input line 30; an air line/wire component 32 connectable to an air source 34; an air valve 36; a combination section 38; and a combined dry, flowable/air outlet section 40. The air valve 36 is operatively connected to the air line/wire component 32. The combination section 38 is positioned to receive dry, flowable agricultural product from the dry, flowable agricultural product input line 30 and air from the air valve 36. The combination section 38 is configured to receive the dry, flowable agricultural product and hold the dry, flowable agricultural product until the air from the air valve 36 discharges the dry, flowable agricultural product. The combined dry, flowable/air outlet section (or exit port section) 40 is connected to the combination section 38 and configured to discharge the dry, flowable agricultural product. The liquid agricultural product input assembly 21 includes a liquid agricultural product input line 42. A liquid line/wire component 44 is connectable to a liquid source 46. A liquid valve 48 is operatively connected to the liquid line/wire component 44 for regulating a discharge of the liquid agricultural product.

Thus, the air valves 36, liquid valves 48 and associated system items to the air valves 36 and liquid valves 48 collectively comprise a pulsing system operatively coupled to output ends of the dry, flowable agricultural product input line 30 and/or liquid agricultural product input line 42 (i.e. agricultural product tubes 30, 42). The pulsing system is also operably coupled to the seed sensing device. The pulsing system is configured to synchronize the placement of low rate agricultural products relative to the placement of seed. Thus, in some embodiments the pulsing system system includes electrical pulsing valves physically placed on the output ends of the agricultural product tubes.

Figure 5:
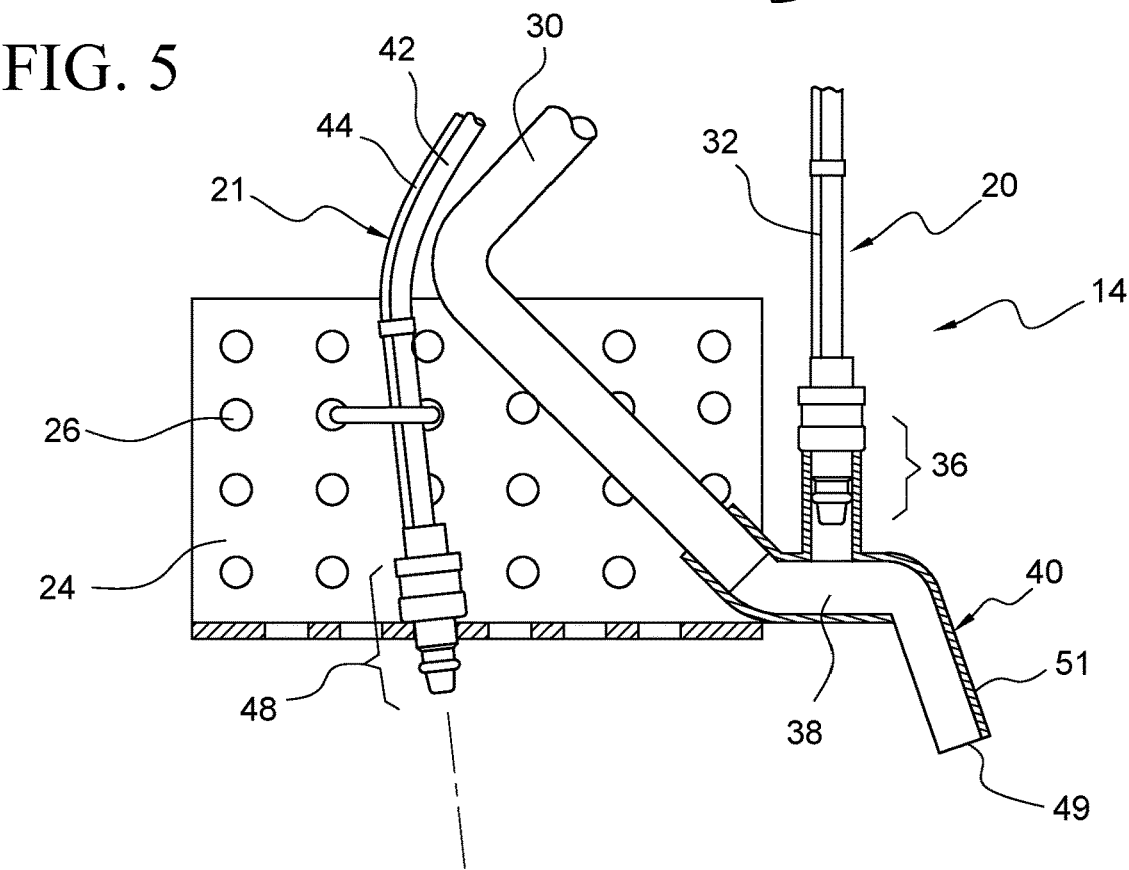
FIG. 5 is a view taken along line 5-5 of FIG. 4.

In a preferred embodiment, the air valve 36 and/or liquid valve 48 may comprise, for example, a type of modified automotive fuel injection valve. As best seen in FIG. 5, both the air valve 36 and the liquid valve 48 are the same type of mechanical device. The active (i.e. operational) part of the valves 36, 48, as denoted by the brackets in this figure, may be, for example, about 1¼ inches long and have diameters of approximately ½ inch. This allows mounting of multiple agricultural product input assembles (including their valves) within the same MLRA product application device 14.

Figure 5A:
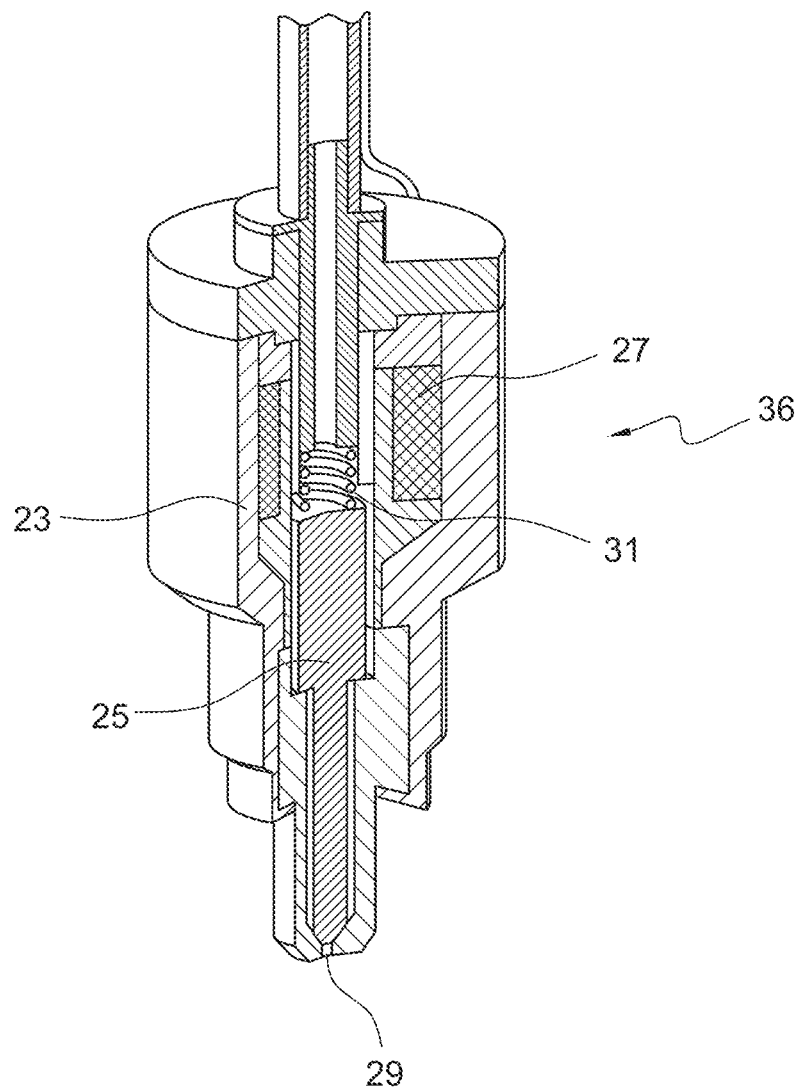
FIG. 5A is a perspective illustration, partially cutaway of an example of a valve.

Referring to FIG. 5A, an example of a valve 36 (or 48), either for liquid or air, is illustrated. The valve 36 includes structures known within the automotive fuel injection field, such as a valve housing assembly 23, an armature 25, a coil 27, an output orifice 29, and a return spring 31. Additionally, there is an air/liquid line and suitable wiring. Utilization of such a valve allows multiple valves to be used within a single MLRA product application device 14.

Each multiple low rate agricultural product application device 14 valve 36 (or 48) may be about 1¼ inches long with a diameter of about ½ inch. Adding wiring, hose, and the mounting housing increases the size slightly but can be designed to fit the length and width of area requirements. A commercially available valve for pulsing liquids on a corn planter is available from Capstan AG Systems Inc., Topeka, Kans. As opposed to the present valve 36 (or 48), The Capstan unit, on the other hand, is about 6 inches long and about 2 inches wide. Also, the Capstan unit, is normally split into two or more components to make it fit in the space available. In the Capstan unit the large size results in the pulsing part of the valve being a long distance from the dispensing tip or orifice, up to three feet on some units, which decreases performance.

Figure 6:
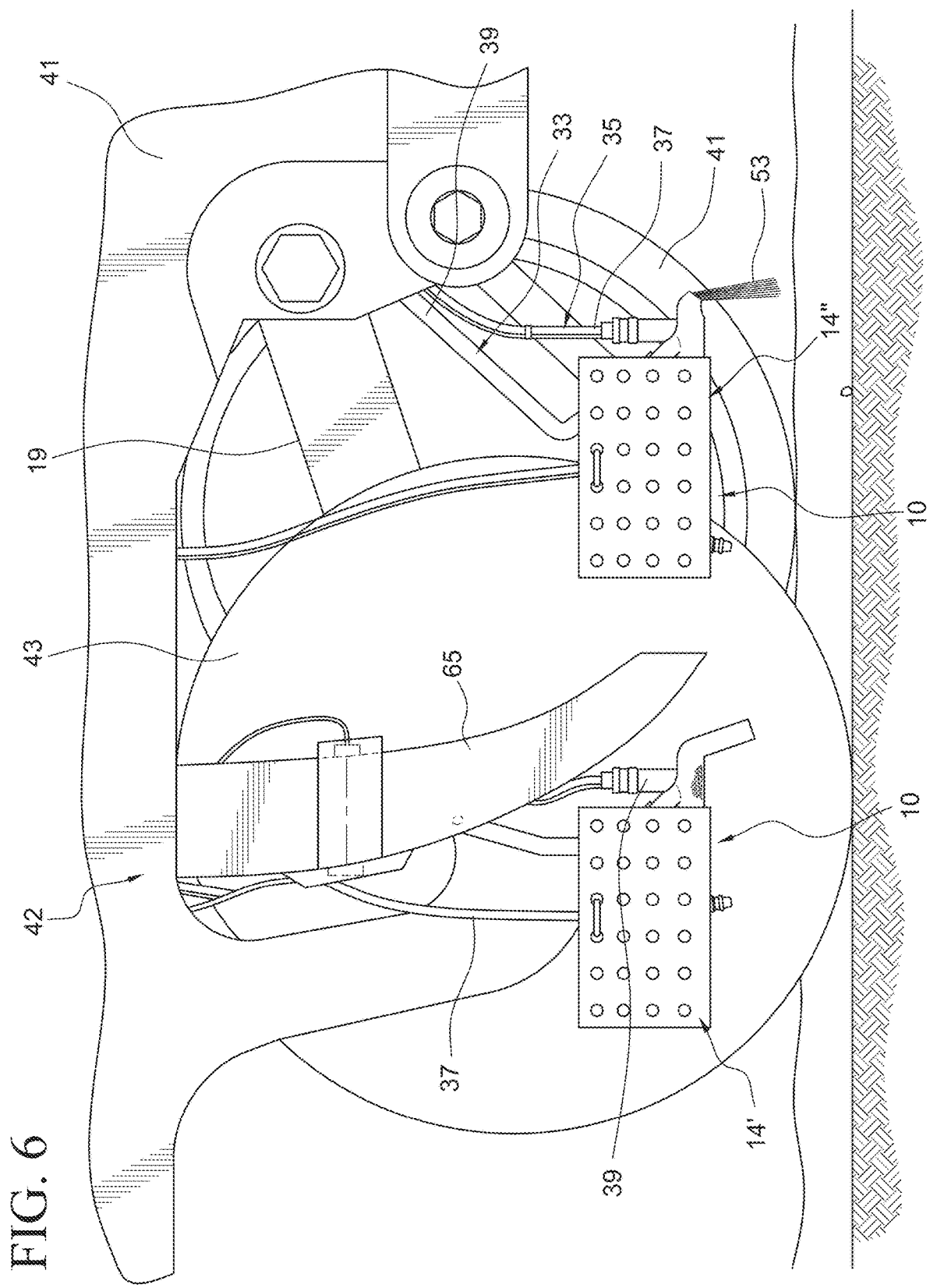
FIG. 6 is an illustration of the system for dispensing multiple low rate agricultural products, including two Multiple Low Rate Agricultural (MLRA) product devices positioned at different locations on the planter.

As will be seen with respect to FIG. 6, in one embodiment of system 10, there can be multiple devices (i.e. MLRA product application devices) 14', 14" mounted on the planter 12. Each device may contain multiple low rate agricultural product input assemblies 33, 35, 37, 39. The agricultural product input assemblies may be various dry and/or liquid or combinations thereof. Device 14", i.e. precision placement equipment, includes placement tube assemblies, i.e. agricultural product input assemblies operatively connected to low rate meter devices to place the agricultural products in the desired locations for efficient activity of the agricultural products in this instance each placement tube assembly (i.e. agricultural input assembly is mounted between depth wheels of a depth control wheel assembly of the planter for placement of product in-furrow between the depth control wheels. FIG. 6 shows one depth control wheel 41. Another depth control wheel has been removed to show the device 14" between the depth control wheels. There is an attachment arm 19 for the depth control wheel 41. Each of the placement tube assemblies 33, 35 includes an elongated placement tube 37,39 arranged so that it descends from a portion of the frame 41 behind the depth control wheels 41 to between the depth control wheels. Device 14 is located in front of the seed tube 65. It is preferably positioned between the opening discs. One opening disc 43 is shown. A second one has been removed to show the device 14'. Thus, both devices 14' and 14" are protected from the wind, trash and other impediments on the soil. In other embodiments instead of utilizing two plates, one plate (for example, attached to a metal strip) may be utilized in a common housing.

Referring again to FIG. 1, in one embodiment, the planting equipment monitor assembly (i.e. seed sensing device) 16 includes an in-cab monitor 50 having a seed status light 52. A planter assembly control module 54 is operatively connected to the in-cab monitor 50, for interfacing input signals from planter sensors. The planter assembly control module 54 functions as a master controller. The planter sensors may be of a variety of different types that provide input to the operator regarding planter functions, e.g. from the seed tube, seed meter pressure sensor, bulk seed tank pressure sensor (not shown), ground speed sensor 56 (see FIG. 1), seed unit ground pressure sensor 58 (FIG. 2), etc.; and, for controlling planter functions (such as ground speed, bulk tank pressure, seed meter vacuum, row unit ground pressure, liquid and dry, flowable application control. There are alternate methods for positioning the monitor 50. It can be positioned as desired on the planter, e.g. under the seed hopper.

Connection means such as suitable wiring 60 is operatively connected between the control module 54 and the planter sensors through a planting equipment monitor assembly wire harness/connector 62. The harness/connector 62 can function as a power distribution box. In one embodiment the power distribution box 62 is operatively connected to a secondary power source (not shown).

In one embodiment, the planting equipment monitor assembly includes a seed tube integrated unit 64 including a seed status light 66. In some embodiments, the seed status light is mounted on a separate module rather than on the seed tube integrated unit 64. The seed tube integrated unit 64 is mounted on a seed tube 65. A control module 68, e.g. a seed status LED light interface module, is operatively connected to the seed tube integrated unit 64 (i.e. seed sensing electronics), for interfacing input signals from planter sensors and for controlling planter functions (such as ground speed, bulk tank pressure, seed meter vacuum, row unit ground pressure, liquid and dry, flowable application control). The control module 68 functions as a secondary controller for actuating the meter devices. The control module 68 receives command data from the master controller 54 and the seed tube integrated unit 64 and seed status light 66 via the power distribution box Connection means such as suitable wiring 70 is operatively connected between the control module 68 and the planter sensors (e.g. seed status light 66) through the planting equipment monitor assembly wire harness/connector 62.

In one embodiment, the multiple low rate agricultural product application device is configured to dispense dry, flowable (e.g. granular) agricultural products at a low application rate, a "low application rate," being defined for dry, flowable agricultural products as a rate below 3 ounces per 1000 feet of row.

In one preferred embodiment, the low application rate of the dry, flowable agricultural products is 1.0-2.0 ounces per 1000 feet of row. In an embodiment the agricultural products are insecticides.

In one embodiment the low application rate of the dry, flowable agricultural products is 2.0-2.99 ounces per 1000 feet of row. In another embodiment the low application rate of the dry, flowable agricultural products is below 2.0 ounces per 1000 feet of row. In another embodiment the low application rate of the dry, flowable agricultural products is 0.01-1.9 ounces per 1000 feet of row.

The multiple low rate agricultural product application device is configured to dispense liquid agricultural products at a low application rate, a "low application rate," being defined as a rate below 3.7 fluid ounces per 1,000 row feet.

With respect to liquid agricultural products, the low rate is limited by the formulation and the size of the particles suspended in the liquid. If the orifice is not large enough to pass the formulation or particles it will plug. It is also limited by the fact that if the orifice is too small it may form a mist which will make it difficult to hit the targeted area. If pure water is utilized, application rates can go down to four or 5 fluid ounces per linear acre with 30" row spacing, or said another way, per 17,424 row feet.

Figure 7A:
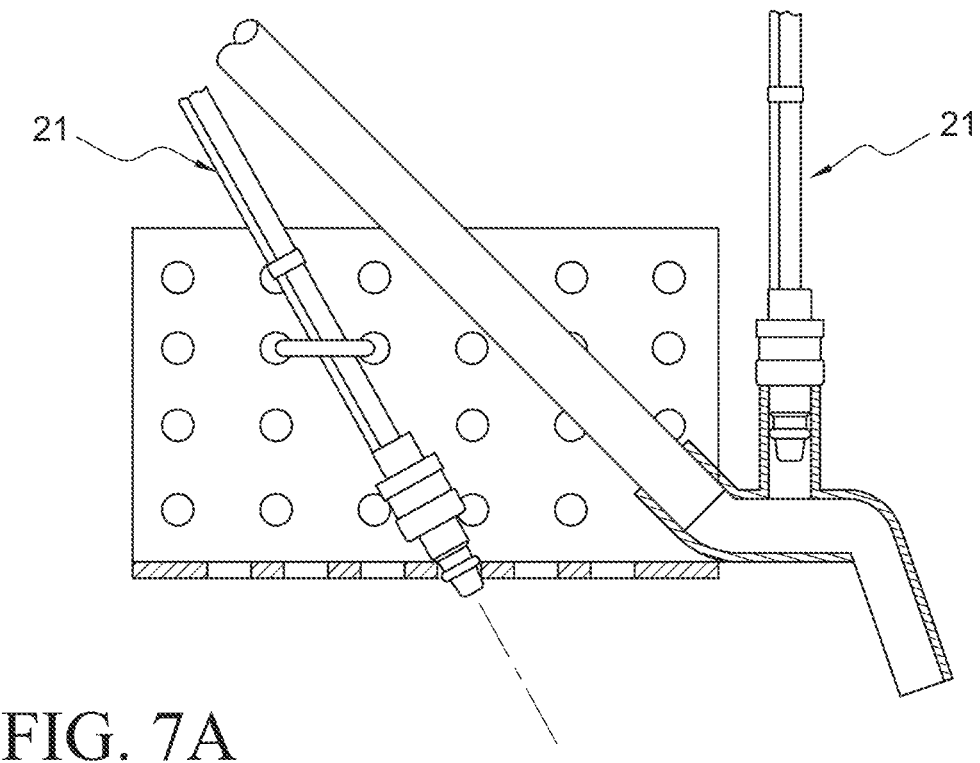
FIG. 7A is a view of the MLRA product application device with a plate removed.
Figure 7B:
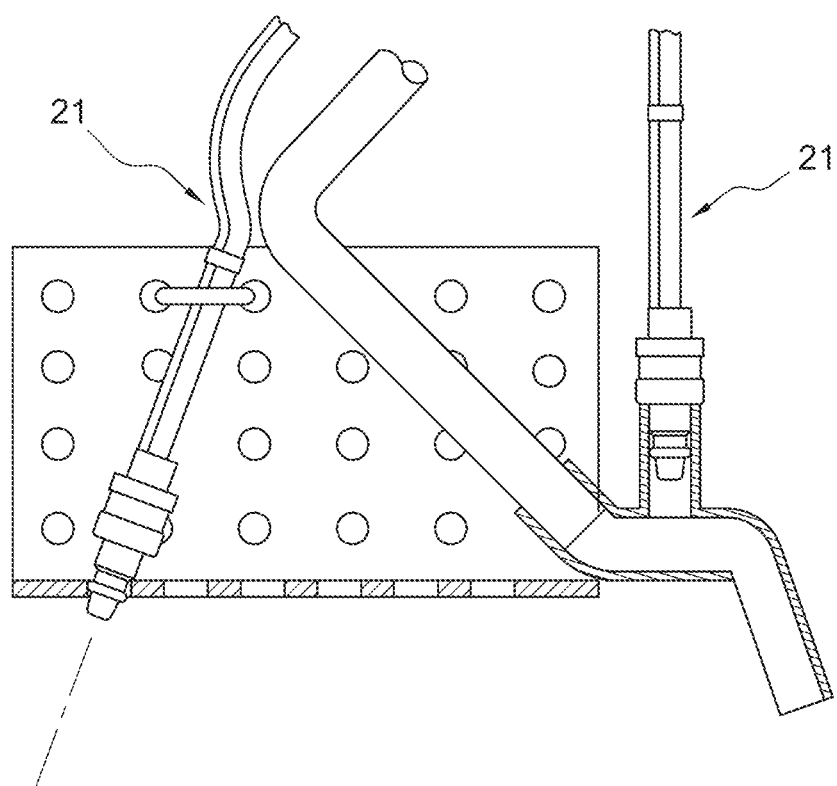
FIG. 7B shows the liquid agricultural product input line adjusted to dispense at a different angle than depicted in FIG. 7A.

Referring again to FIGS. 4 and 5, it can be seen that the low rate agricultural product input assemblies (i.e. discharge guides) 20, 21 can be angled appropriately by fasteners 45. The fasteners may be of a wide variety of types, for example, plastic or metal bolts or screws. Items such as zip tie fasteners may be used. Thus, referring to FIGS. 7A and 7B, the liquid agricultural product input assembly 21 is shown adjusted at different angles. Furthermore, the dry, flowable agricultural product input assembly 20 is shown with a modified dry, flowable agricultural product input line 30 which is curved to meet the requirements of the planter frame.

Referring again to FIGS. 4 and 5, the exit port section (i.e. combined dry, flowable/air outlet section 40) includes, in the embodiment shown, a trough 47 at the end of the chemical tube 49 where agricultural product is collected. The air valve 36 is mounted at one end of the trough 47. The upper entry point of dry, flowable agricultural products (granules) is between the air valve 36 and the discharge opening 49. The air valve 36 fires and the granules are blown through the trough 47. The discharge end of the trough 47 has a U-shaped discharge guide 51.

The U-shaped discharge guide 51 performs several functions:

1. It protects the discharge opening 49 from foreign material entering it and plugging it.

2. In one embodiment the discharge guide 51 can be tilted through a range of about 90-120 degrees to provide guidance for the granules to hit the aim point, eliminating the need for complicated electronics to provide accuracy. It may have an added insert to change the angle for hitting the aim point.

3. It also protects the liquid discharge from the liquid valve 48 (and from any other sources of liquid contamination) from entering the trough 47, which could result in product plugging and otherwise missing the target area.

4. The U-shaped discharge guide 51 is preferred rather than a tube or pipe type discharge because the open side of the guide 51 prevents granules from building up in the discharge from debris, wet soil, crossing wet spots in the field, etc.

5. The open front side prevents residue such as plant stalk from lodging in the discharge port.

Referring again to FIG. 6, in one embodiment a brush 53 can be used instead of the U-shaped discharge guide 51. Using such a brush 53 can result in better placement in some planting conditions, such as high residue and wet conditions.

Another brush (not shown) may be utilized in the air valve system between the granule intake and discharge opening to work like it does with seed dispensing devices. Such a brush may reduce the unintended and less than efficacious application of minute quantities of product during the interval of time between the pulsed bursts of air.

The present invention allows different products to be introduced into the furrow with desired placement relative to the seed. In one embodiment, only one signal is needed to signal any group of valves to fire. This means that where the product is applied in the furrow is determined by the valve position. Therefore, noncompatible products can be applied at the same time in different positions. As noted above, the valve assembly can be mounted either behind the seed tube or in front of it. There is enough room to mount up to three valve assemblies depending on where the product is required to hit the seed furrow. Also, normal seed spacing for corn is about 6 inches. The normal seed spacing for soybeans is about 1 to 4 inches depending on the row width. No matter when the signal from the seed sensor is given the valve can be positioned to hit with the proper timing and placement.

One reason to pulse granules and liquid is that granules can be more easily designed for timed release but liquids work better for quick control. In one embodiment, for example, if it is desired in an application for immediate response to pests that attack corn seed but also a need for late season control of corn rootworms, both an encapsulated granular and liquid can be used. Also if it is desired to apply both liquids and/or granular products that are not completely compatible with each other when they are in the same solution or direct contact, they can be pulsed in different locations in the furrow or near the furrow in the row.

The signal to drive the device of the present invention can be supplied in many ways. There are several commercial controllers such as a Capstan AG Systems, Inc. Seed Squirter controller; a Great Plains Ag planter unit; and a 360 Yield Center controller. Since the devices of the present invention can be manually adjusted they can be controlled/driven by wiring them directly to the planter monitor, Y-ed into the seed flow sensor connector, and/or a magnetic/emf/ electric field sensor can be used with individual circuitry for each row. Also, if electrical timing is desired "delay line" modules can be used without complicated electronics and processors. "Delay Lines" are commonly used for signal processing.

In one embodiment, as can be seen in FIGS. 1-2, a rigid product container 130 may be utilized for low rate, dry flowable agricultural products. A liquid product container 131 is shown, by way of example, next to the rigid product container 130; however, there is much flexibility in the location of such a liquid product container 131. Additionally, as it is understood by one skilled in the field, there may be a variety of different rigid product containers and/or liquid product containers. The liquid product containers may each include a pump, or may be connected to a liquid supply pump.

In certain embodiments rigid containers may be used. Use of rigid containers for low rate, dry flowable agricultural products maintains agricultural product integrity during shipping and storage. This will be discussed below in more detail.

Although not preferred, pallets of bagged product may possibly be used. Bagged product was typically used in the past and the product was stacked four or five pallets high in a warehouse for a period of months. A common procedure is to drop a bag on the ground or floor to break up any lumps that might have developed in the bag as a consequence of being stored. Standard application equipment has rotors to help grind up lumps. This is moderately effective at application rates that are higher than the low rates previously described in this document, because the control orifices in the bottom of many currently available meters are large enough to pass the lumps that remain after the bags have been dropped as previously described. Lumps (or clumped material) that doesn't get broken up, if small enough, can be forced through the orifice due to the turning action of the rotors that are positioned before the metering device. However, at the low application rates described herein, the control orifice has to be small enough to control the flow, and essentially any lumping will cause a blockage and prevent the metering device from applying the product in a consistent and efficacious manner. Also, a problem with paper bags is that cutting them, tearing them open, or other opening techniques can allow small pieces of paper to enter the application system, which can also cause plugging and/or blockage issues. Finally, filling the planter equipment from non-closed systems with open lids can allow foreign material such as dirt, seed residue, etc., to enter the system, causing plugging. This is especially problematic on windy days.

The utilization of rigid product containers obviates the problems mentioned above.

A low application rate meter device (i.e. agricultural product metering system) 132 operatively connected to the rigid product container 130 is configured to dispense the agricultural products from the product containers (i.e. from a plurality of sources of low rate agricultural products sources) 130.

The material dispensing system of the present invention may be used with other types of agricultural implements, but is primarily used with seed planting equipment. Although the Figures show a single row of planting equipment, typical planters include multiple rows, for example, up to 48 or more.

Referring now to FIG. 8, a simplified schematic illustration of one embodiment of the major components of the system of the present invention is shown, designated generally as 140. The seed tube integrated unit 64 provides a signal to the light interface module 68. Or, the in cab monitor 50 can provide the signal to the light interface module 68. The light interface module 68 signals the air valve 36 and/or liquid valve 48 to apply liquid agricultural product and/or dry, flowable agricultural product.

Although only a couple of arrangements of the liquid and the dry, flowable agricultural product input assemblies have been illustrated above, it is understood that the arrangement of these input assemblies depends on the product supplied, the type of planter that is used, and how that product needs to be placed. For example, although an arrangement has been described above as including one liquid and one dry, flowable input assembly, it is understood that in some circumstances there may be multiples of the liquid and/or dry, flowable input assemblies.

Figure 9:
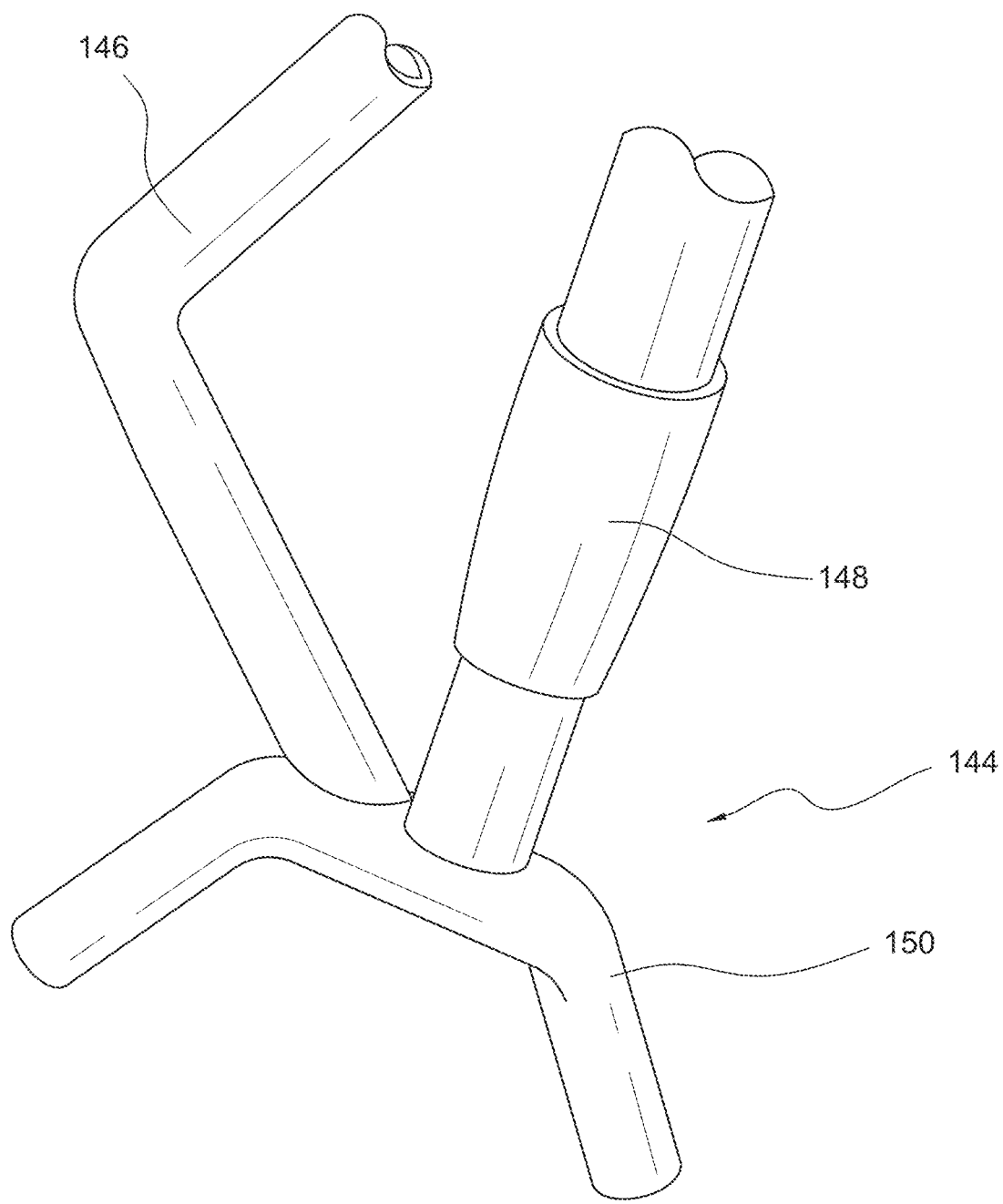
FIG. 9 is a perspective view of an embodiment of a dry, flowable agricultural product input assembly which allows application in two directions.

Referring now to FIG. 9, an alternate embodiment of a dry, flowable agricultural product input assembly, designated generally as 144, is illustrated, which allows application in two directions. A dry, flowable product input tube 146 and air valve 148 cooperate in a bi-directional housing 150 with a front application port 152 and a rear application port 154 for discharging the dry, flowable agricultural product multiple directions if desired. A unique feature of this embodiment is that it is capable of pulsing out a more uniform line of product than an input assembly with a single output port. Therefore, it can be operated at very low rates and pulse a continuous line of agricultural product in the furrow. For example, if the device pulses a six inch line of product, it can be fired at every six inches to provide a continuous application of product. Therefore, if there is a six inch seed spacing then pulsing with the seed will result in a continuous stream of product in the furrow. Another example of pulsing with low rates is, instead of synchronized pulsing of product with the seed, there is pulsing every 6 inches (in accordance with distance traveled) and production of the same results as pulsing with the seed.

A sensor apparatus is preferably included that detects when the delivery point for the agricultural product is not where it is supposed to be. As background, in order for synchronized applications to work, the farmer needs to be informed if for any reason the product being applied isn't being placed properly in proximity with the seed. For, example, if applying a strip that is very short, the pulsing might be working very well, but if the nozzle is mis-aimed, that treated strip will not be in the correct position relative to the seed, and the desired effect on the crop will not be realized. Therefore, a sensor apparatus notifies the farmer if the product delivery point is not where it is supposed to be.

In some embodiments, and preferably, a sensor apparatus is included that detects when the delivery point for the agricultural product is not where it should be. An example of such a sensor apparatus is disclosed and claimed in U.S. Ser. No. 15/822,181 entitled FLOW SENSOR BASED ON ELECTRICAL CAPACITY.

Figure 10:
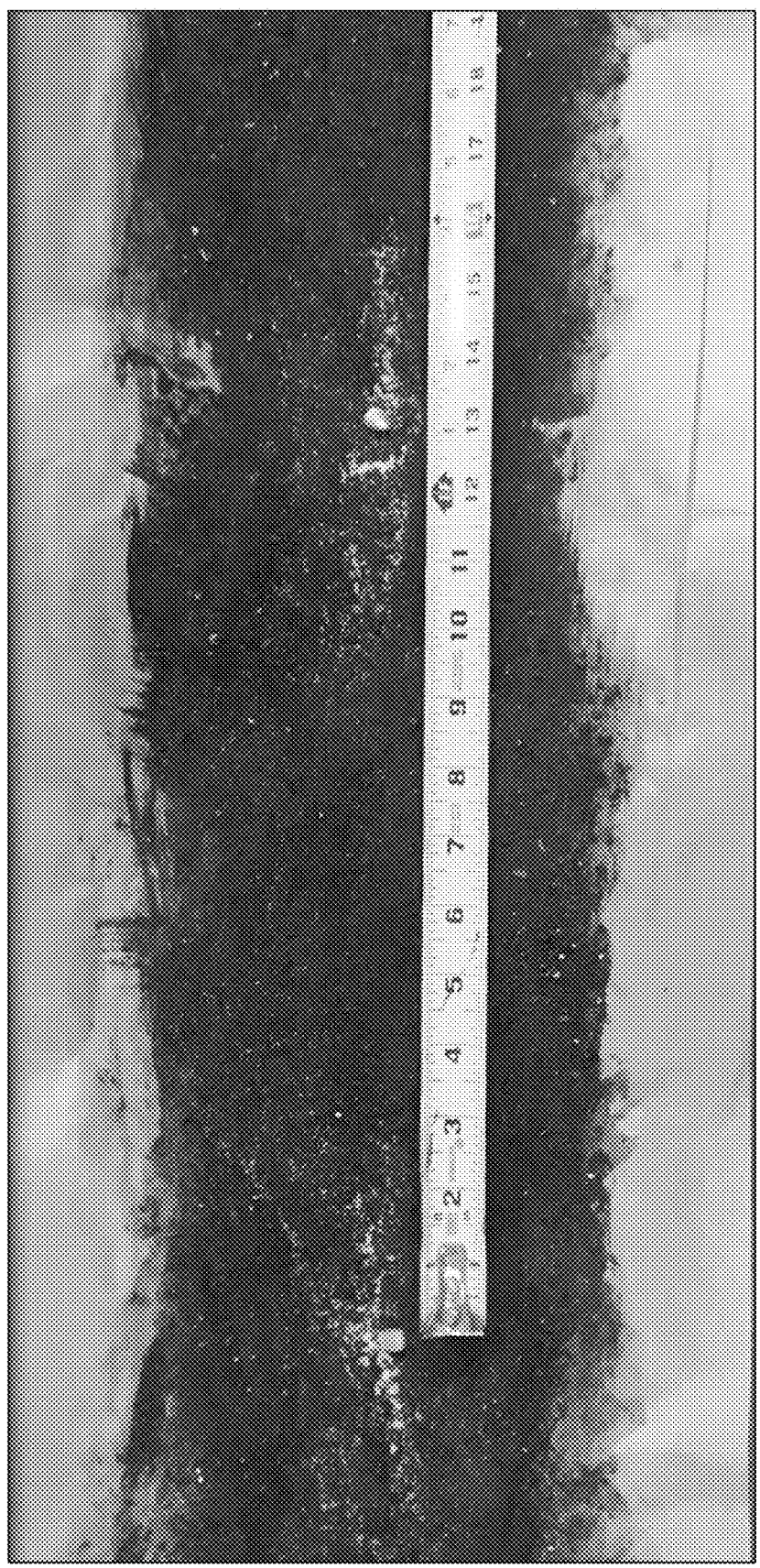
FIG. 10 is a photograph of an example test of a multiple low rate agricultural product application device utilized with a single dry, flowable agricultural product input assembly illustrating granules dispensed in a concentrated pattern in close proximity to the seed.

Referring now to FIG. 10, a single still image picture taken from a high-speed/slow-motion video that was taken during an an example test of the operational advantages of the system 10. In this test setup, a multiple low rate agricultural product application device was utilized with a single dry, flowable agricultural product input assembly. A dry, flowable agricultural product, in this case a placebo white granular calibration product, was used with corn seed that was color dyed. The corn seed was applied using a Precision Planting high-speed unit mounted on a John Deere row unit. Paper was used under the row unit traveling at planter speed. The seed spacing in this example run was 13 inches. As can be readily seen, the granules were dispensed in a concentrated pattern in close proximity to the seed. This resulted in a zone between each seed that receives little to no chemical. This is an example of seed delivery being synchronized with dry, flowable agricultural product.

Figure 11A:
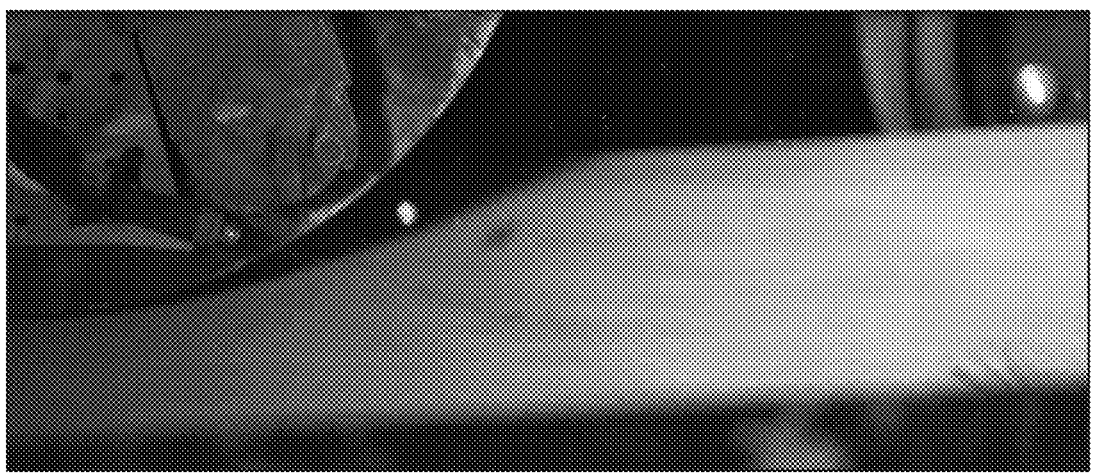
FIGS. 11A-11C are sequential photographs of synchronized delivery of seed with liquid.
Figure 11B:
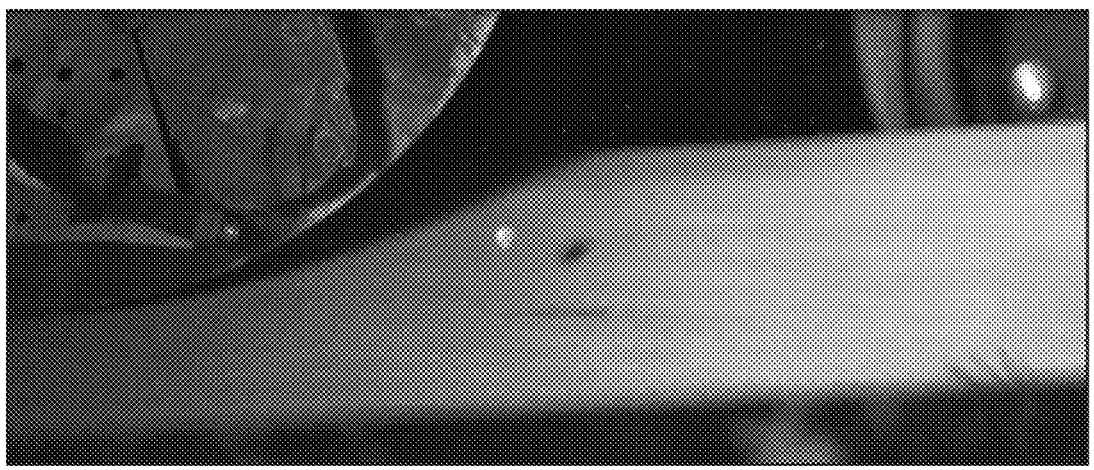
Figure 11C:
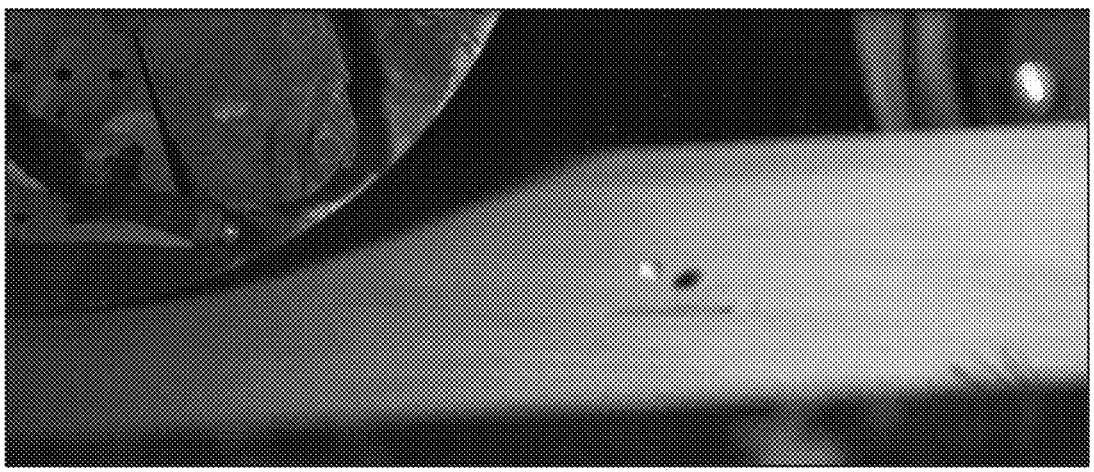
Figure 12:
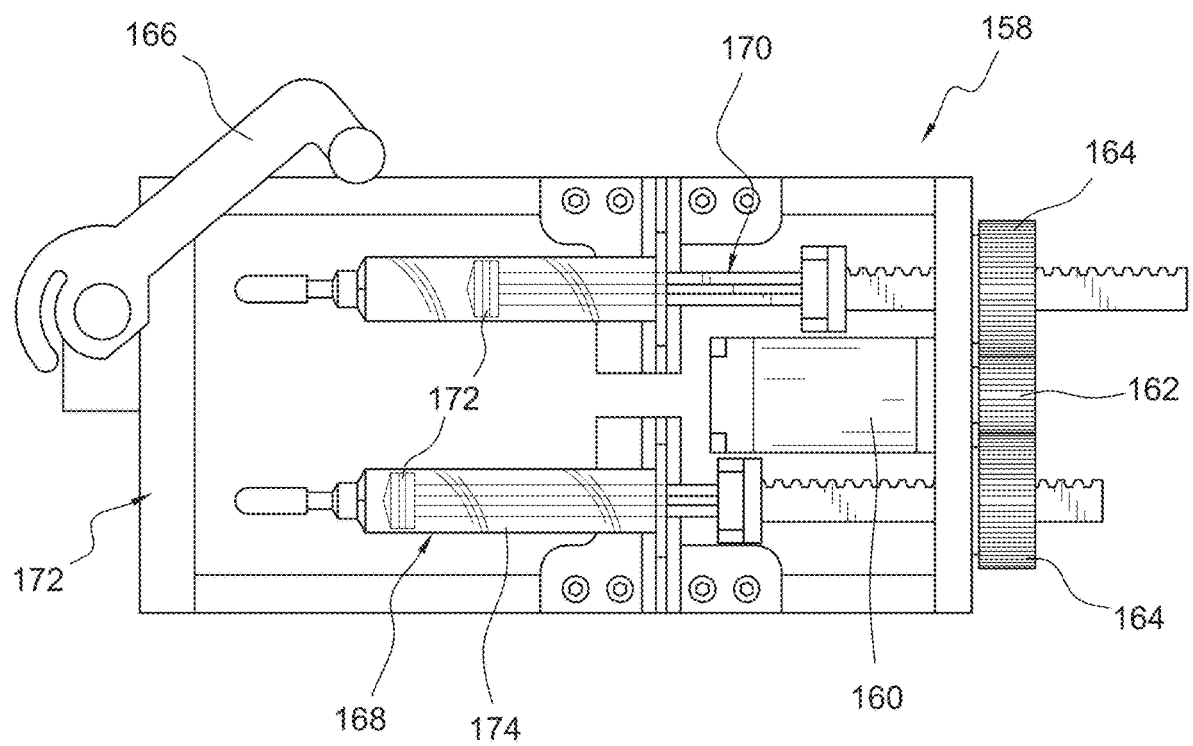
FIG. 12 is an illustration of a syringe pump that may be utilized to apply in-furrow liquid products at low rates.
Figure 13:
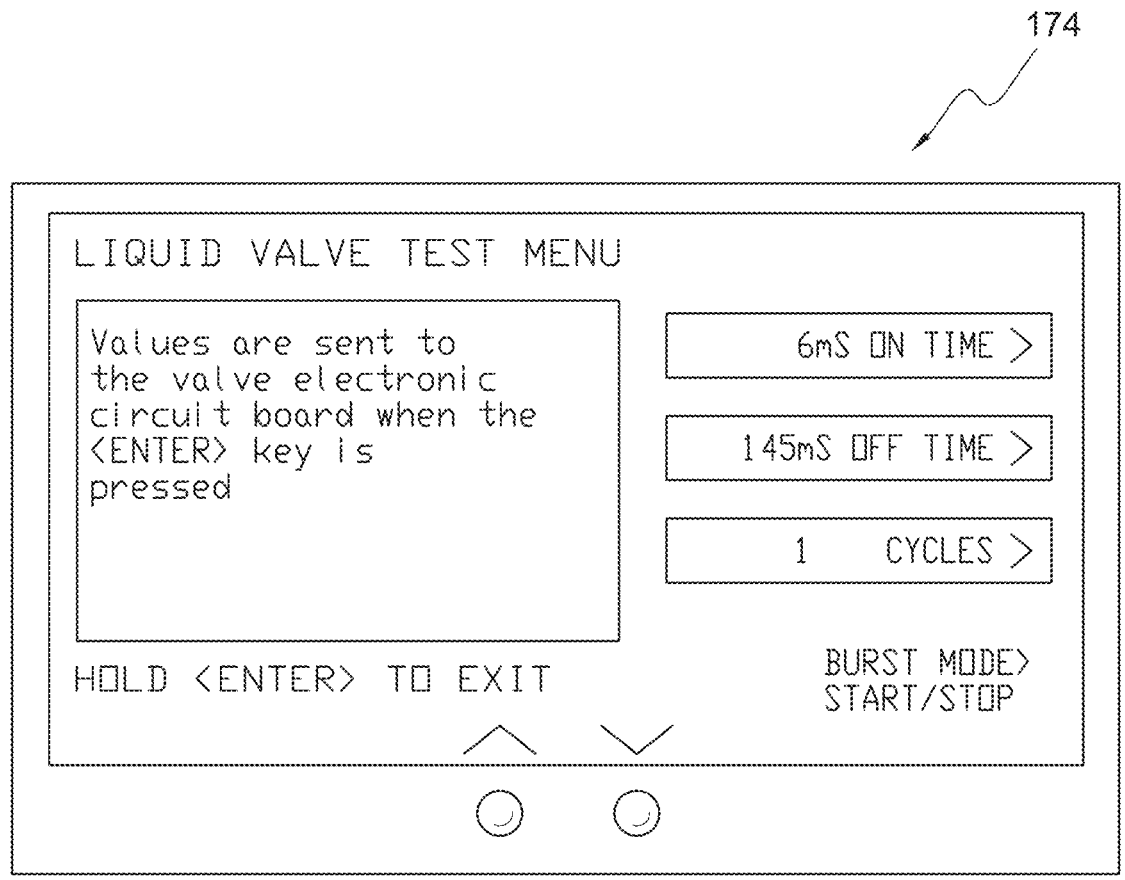
FIG. 13 shows an example display for a pulsing valve controller.

FIGS. 11A, 11B, 11C are sequential still pictures of synchronized delivery of liquid with individual seeds. In FIG. 11A a stream of liquid is shown being output from the liquid agricultural product input assembly. In a synchronized fashion seed is being output from the Precision Planting high-speed unit. FIG. 11B shows a line of liquid dispensed on the paper. At that time the seed is still airborne. FIG. 110 shows the seed ready to impact the liquid on the paper. A high speed video was used.

As was the case with dry, flowable product, in another example there may be non-synchronized pulsing of liquids with low rates. Instead of synchronized pulsing of product with the seed, there is pulsing every 6 inches (in accordance with distance traveled) and production of the same results as pulsing with the seed. Instead of using an output nozzle that squirts a straight stream, a spray type nozzle is used, such as a flat fan jet nozzle, which produces a line of product parallel to the planting direction in the bottom of the furrow. The advantage of pulsing in this manner allows use of bigger orifices in the output device providing less plugging with denser products.

Looking at the soil behind the planter is the standard procedure for checking for accurate placement of at-planting, in-furrow-applied agriculatural products. With the system of the present invention, the application rates of agricultural product(s) are normally so low that unaided visual observation is difficult, or maybe even impossible. With the present system, product placement can be set and visually confirmed by simultaneously operating both the agricultural product application system and the seed dispensing mechanism while the planter is stationary and in planting position, and noting the placement of the product(s) in relation to individual seeds or seed groupings, as the product(s) and seed strike the ground or any surface beneath the planter, in the event the testing process is conducted in a building with a floor.

The system of the present invention is particularly adapted for use with a planter configured to operate at a high planter speed. As the term "high planter speed" is used herein it refers to a speed greater than 5 mph. However, it is emphasized that the system of the present invention, in some embodiments, can operate at much lower planter speeds such as in a range of between about 2 mph to 5 mph. Thus, the seed sensing device is configured to sense placement of seed as appropriate from the planter, and commensurate planter speed utilized for a specified purpose.

The agricultural product metering system may comprise various types of systems. For example, the agricultural product metering system may be a solenoid system or a syringe-based pump system. Various pumps can be used, to apply in-furrow liquid products at low rates. For example, referring to FIG. 12, a syringe-based pump assembly, designated generally as 158, is illustrated.

The syringe-based pump assembly 158 includes a stepper motor 160 connected to a drive gear 162 operably connected to two screw motors 164. A common lever 166 operably connected to two syringe assemblies 168, 170 are contained within the pump assembly housing 172. Each syringe assembly 168, 170 includes a syringe piston 172 and a syringe element 174. The liquid output from the pump is synchronized with delivery of the seed by using the same seed (planting) sensors described above.

Use of a syringe-based pump assembly 158 in conjunction with the synchronized pulsing techniques discussed herein provides the synergistic ability to dispense liquid low rate agricultural products an ultra-low-rate, discussed above as defined as below 0.9 fluid ounces per 1000 row feet. The concept of reducing the total quantity of liquid product that is applied with the syringe pump is consistent with the previously described results of ultra-low rate liquid application, where deposition or placement of the liquid product is limited to an area of as little as one-quarter inch of row spacing, and within one-quarter inch of individually placed seeds or seed groupings. The process of using the seed sensing device to control the pulsed delivery of the liquid product, such that deposition (application) of the liquid product in the target area is synchronized with individual seeds or seed groupings, is consistent for both syringe pump ultra-low rate liquid applications and for ultra-low rate liquid synchronized application that's accomplished with the modified fuel injector assembly described previously herein. While the means of pumping or pushing the liquid product through the application orifice differs dramatically between the syringe pump and modified fuel injector, the objective of providing an ultra-low rate of liquid product in synchronization with an individual seed or seed grouping is consistent, and the highly disparate embodiments demonstrate that one skilled in the art might conceive of alternate methods to accomplish this task.

Thus, the syringe pump provides the capability to apply a single continuously applied liquid product at a low rate of less than 3.7 fluid ounces per 1000 row feet when operated at speeds of 5 mph or less, or speeds greater than 5 mph. Furthermore the syringe pump provides the capability to apply a single synchronized liquid product at an ultra-low rate of less than 1.0 fluid ounces per 1000 row feet when operated at speeds of 5 mph or less, or speeds greater than 5 mph.

An advantage of certain embodiments of the present invention is that they can obviate the use of many complicated electronic driving systems. However, in certain embodiments electronic driving systems may be used. For example, it may use a distributed control system that includes a main microcontroller, which communicates to a plurality of sub-controllers. (As used herein the term sub-controller may alternatively be referred to as a secondary controller, slave controller, or row controller.) The sub-controllers implement commands received from the main control unit by applying electric power to a metering system. The agricultural product container may contain a memory device for retaining information pertaining to the material in the container and to a metering device of the metering system. This information is used by the main control unit (i.e. main microcontroller or master controller) and the sub-controllers to properly dispense the product.

The material dispensing system, in some embodiments, is a distributed control system that employs the master microcontroller computer located in the operator's cab or integrated into the onboard master display and control system of the tractor. This master or main controller distributes command and control information via a high speed serial communications link, via a power distribution box, to the sub-controllers connected to individual meter systems. Each row corresponds to one row in the field being planted. Each individual meter system is controlled by its own slave or row controller. The meter system includes an electronic memory circuit and a metering or dispensing device. The meter system can be permanently attached to a union device which enables product to flow to the meter from the product container which is also attached to the union device. The meter system may be attached using a known tamper-evident securing system. The row controller includes a material flow sensor which is integral with the row controller. The material flow sensor detects the presence or absence of flow from the product container.

The main microcontroller unit may include a display and keypad for operator interface. In some embodiments a speed sensing device such as radar, GPS, or wheel speed sensor is connected to the main control unit to provide for the tracking/monitoring of ground speed. Ground speed is used to modify the material dispensing rate to account for the planter's speed. The main control unit is connected to a plurality of junction boxes. The junction boxes are operatively positioned between a power distribution box and the secondary controllers by a high speed serial communications link. The main controller is in constant communication through the communications link to the secondary controllers 60 located on the planter.

In some embodiments the secondary controllers (i.e. row control units) allow a method of multiplexing signals going to the main controller. A benefit is that the main controller can control a planter with only nine wires going to a junction box. One pair of wires is used for serial communications, three pairs of wires are provided for power to the row control units and to the metering devices. Three pairs of wires are used for power to more evenly distribute the current requirements. The power distribution box obviates the need for power to be supplied by the master controller to the secondary controllers. The power distribution box is independently connected to a power source as indicated by numeral designation. The power distribution box is also connected to a lift switch. The power distribution box has three serial ports for connection to the junction boxes. It includes suitable electronic overload protectors to prevent damage to the system. The lift switch prevents operation of the metering devices when the planter is raised, I.e., not in planting position, thereby preventing product from being dispensed when the planter is not lowered into planting position.

The main controller also contains a suitable non-volatile memory unit, such as "flash" memory, a memory card, etc. Information pertaining to the usage and application of agricultural products is stored in this non-volatile memory unit. This information is used to prepare printed reports which meet EPA reporting requirements. Currently, farmers prepare these written reports manually, however, some product containers are equipped with RFID tags or alternate means of electronically communicating information about the product(s) being applied, thus enabling application records to be created automatically, without requiring human or operator input.

A preferred junction box can connect up to eight row control units to the power distribution box. If the planter has more than eight rows, additional junction boxes can be connected to the power distribution box. The lift switch is connected to the power distribution box. This switch indicates when the planter is not in an operating position. Other interfaces to the main control unit may be provided (such as serial or parallel links) for transmitting information to other computer systems or printers.

The row control unit has memory devices and logic devices within to modify and implement the commands from the main controller. The row control unit can read information from a container memory circuit attached to the container and may manipulate the commands from the main controller to properly operate the metering device. For example, if the concentration or use rate of product on row 1 is different than the concentration or use rate of product on row 8, the row control unit can modify the commands of the main controller to properly dispense products to each row. The row control unit also reads metering device calibration data from the container memory circuit and modifies the main controller commands to account for differences in performance of different metering devices.

The row control unit allows the possibility to completely change the programmed functions of the main controller. As an example, if a pre-programmed row control unit is placed on a liquid herbicide sprayer, the main controller would be able to read the dispenser type information and operate as a liquid sprayer controller.

One embodiment shown in the figures uses one row control unit to control one metering device and memory unit. A row control unit can control more than one device, for example, two metering device and memory units, or one metering device and memory unit and one seed hopper and seed planting mechanism.

The seed planting mechanism typically includes a plurality of agricultural product tubes operatively connected to the agricultural product metering system.

Each container supplies a metering or dispensing device, which allows controlled application rates under different conditions. The metering device may be an electromechanical solenoid driven device for dry material. Other type of dispensers may be used for other materials, such as liquids. One type of metering device is described in U.S. Pat. No. 7,171,913, entitled "Self-Calibrating Meter With In-Meter Diffuser". Another type of metering device is described in U.S. Pat. No. 5,687,782, entitled "Transfer Valve For a Granular Materials Dispensing System". Another type of metering device is described in U.S. Pat. No. 5,524,794, entitled "Metering Device for Granular Materials". Another type of metering device for dry granular material is described in U.S. Pat. No. 5,156,372, entitled Metering Device for Granular Materials. Another type of metering device, is described in U.S. Publication No. US20170043961A1, entitled Brush Auger Meter, which describes a device for metering granular or powdered product, having a meter housing, an auger housing positioned within the meter housing, the auger housing having an inlet opening for receiving the granular or powdered product, a rotatable spiral brush mounted within the auger housing, a first discharge outlet near one end of the auger housing for discharging granular or powdered product, and another opening near another end of the auger housing for discharging granular or powdered product not discharged through the first discharge opening. U.S. Pat. Nos. 7,171,913; 5,687,782; 5,524,794; 5,156,372 and, U.S. Publication No. US20170043961A1 are incorporated herein by reference in their entireties.

The master controller and the secondary controllers are configured to provide operator defined multiple groups of rows. Each of the rows in a group has an operator assigned dispensing rate and operator assigned agricultural product. In some embodiments, the operator will be a pre-established electronic prescription rather than a human being. The dispensing rate and agricultural product are controllable by the operator during operation, according to planting or field needs. Such individual row control is normally provided from an electronic prescription map. The master controller 10 and the secondary controllers 60 are configured to control multiple groups of rows simultaneously. A group of rows may include a single row. Thus, for example, on a 48 row planter, 48 different products can be applied, each at its own specific rate, with the rate being totally variable, such that the rate can be increased, decreased, or turned completely off, based on the geographic position of the planter or application system. Furthermore, each of the products and their corresponding rate can be recorded by the master controller 10 for use in record keeping.

The combination of an electronic memory and a product container with attached corresponding metering device may, in combination, form a material container capable of electronically remembering and storing data important to the container, the material dispensing system, the agricultural product and the geographic position any time product is being dispensed, and the route of travel when the planter is in the planting position. Among the data which could be stored are: a serial number unique to that container, product lot number, type of product, metering calibration, date of filling, quantity of material in the container, quantity of material dispensed including specific rates of application at any given location, and fields treated. These stored data can be recalled and updated as needed. The stored data can also be used by a metering controller or pumping system by accessing specific calibration numbers unique to the container and make needed adjustments, by sounding alarms when reaching certain volume of product in a container, or keeping track of usage of the container to allow scheduling of maintenance. The electronically created as-applied records can also be provided to various interested parties (e.g., government agencies, food purchasers or processors, or consumers) as evidence of the products that were applied and the rate at which they were applied, to the field, or to various areas or locales within a field, in which the crop was produced.

In one embodiment, after configuration, the operator is able to set product and application rate groups. In such an embodiment, there are multiple groups of rows that are defined by the operator. The master controller and the secondary controllers are configured to control the multiple groups of rows simultaneously. However, it is within the purview of the invention, in this embodiment, that the operator defines a single group. Different groupings will be discussed below in detail. The operator can define the rates and products for each row.

The material dispensing system features and capabilities, in some embodiments, include:

1) Controls application rate of material under varying operating conditions. The application rate(s) can be set by the operator from an operator's console or can be automatically read from the material container meter unit.

2) Provides actual ground speed information if a ground speed sensor is attached. A typical ground speed sensor includes GPS, wheel rpm and radar. In lieu of a ground speed sensor, a fixed planting speed may be entered and used to calculate the application rate of the product material(s).

3) The system monitors material flow and alerts the operator to no flow, empty container, or blocked flow conditions.

4) The system may monitor and track container material level(s) for each row.

5) The system provides control information and data to a non-volatile memory for future downloading.

6) The system monitors the planter to allow product to be applied only when the planter is in the planting position.

A typical usage for this system is:

1) In some embodiments, for a new product container, the metering device and memory unit may be attached to the product container by either the container manufacturer or at the container filling site. In other embodiments, the metering device and memory unit may be attached to the product container by the grower.

2) A computer is connected to the metering device and memory unit. (In some embodiments this might be at the time of filling.) The following information may be electronically stored in the memory device:
   a) Date
   b) EPA chemical ID numbers
   c) Container serial number
   d) Suggested doses, such as ounces per linear row foot for root worm, or ounces per acre for grubs, etc. These rates are specified by the manufacturer.
   e) Meter calibration information, depending on type of metering device
   f) Tare weight of the container
   g) Weight of the full container 3) The product container is sealed and prepared for shipping 4) The user attaches the product container to a dispensing implement, such as planter, sprayer, nurse tank, etc. The main controller receives the information from the metering device and memory unit pertaining to proper application rates and prompts the user to pick the desired rate(s). The row control unit reads the metering device(s) calibration information from the metering device(s) and memory unit (s). This information is used in combination with commands from the main controller to properly control the operation of the metering device(s). The user may enter a field ID number and any other required information such as number of rows, width between rows, etc. The user applies the product(s) to the field. The main controller monitors the ground speed and changes the amount(s) being dispensed to keep a constant rate(s) per acre. When the user completes the application to a field, additional fields may be treated. Field data, including field ID number, crop treated and quantity(ies) applied are recorded in the main controller's non-volatile memory. This information may also be recorded in the metering device(s) and memory unit for later use by the user, the agrochemical distributor or product supplier.

There may be a group of rows. For example, there may be four groups—Group A, Group B, Group C, and Group D—designated for a sixteen row planter. The grouping feature allows the growers (operators) to apply the correct product at different rates for designated rows in one planting operation. This example indicates that Group A includes rows 1-2 with Aztec® pesticide at a rate of 1.5 ounce per 1000 feet of row. Group B includes rows 3-8 with Aztec® pesticide at a rate of 2.5 ounce per 1000 feet of row. Group C includes rows 9-14 with Counter® pesticide at a rate of 2.9 ounce per 1000 feet of row. Group D includes rows 15-16 with Counter® pesticide at a rate of 2.3 ounce per 1000 feet of row.

This feature allows the grower to use different or the same product at different rates due to different seed traits on designated rows. For example, this feature allows use of a lower rate(s) of product on triple stacked or quad stacked corn seed (root worm traits) on most rows on the planter but on designated rows the grower may be planting refuge corn seed (non-root worm trait or non GMO corn). This allows the use of higher rates of product for the non-traited corn.

In certain embodiments the product release on the seed within a row can be identified with color or another tracking mechanism such as detection by size differential. This can provide differential application of product. For example, different colored seed rates or products can be switched by making the seed sensor color sensitive. Other seed characteristics can provide this differentiation such as infrared detection (by heating the seed), magnetic detection, etc.

The grouping feature discussed above allows the grower to use different products at different rates so he/she can do comparative evaluations to see which product and rate works best for their farming and production practices.

The grouping feature allows the growers to use different products and rates as required by a third party. For example, this feature can be used in seed corn production where the male rows typically receive a partial rate of insecticide.

The grouping feature allows seed corn companies to run different trials of products and rates on new seed stock production trials to determine what rates and products are best for their particular seed. For example, certain parent seed stock may respond (positive or negative) to certain crop protection products and rates of the products. This grouping feature allows the research to be accomplished in a timely fashion.

Setting row groups allows the grower to shut off certain rows while maintaining flow as needed from the rest of the row units. This saves product(s) and money where the product(s) is/are not needed.

In some embodiments the present system for dispensing agricultural products may include a plurality of sets of agricultural product containers. Each of the sets of agricultural product containers is associated with a respective row in the field. Agricultural product from each agricultural product container is dispensed in accordance with operator-defined instructions to the master controller. The instructions are capable of being provided to the master controller during planting allowing the dispensing of individual product containers to be controlled. Command data may be of various types and from various input sources including, for example, field condition mapping using satellite telemetry combined with GPS location; previous year yield data input; soil analysis; soil moisture distribution maps; and, topographical maps.

Referring again to FIG. 1, the product containers 130, 131 each have an identification device 133 that may be positioned in association with a product container for providing identification information to a master controller. The identification device 133 is generally affixed to the container 130, 131. The identification device is preferably a radio-frequency identification (RFID) chip for providing identification information to the master controller. In one embodiment the master controller 10 assigns the product container 130, 131 and its operatively connected meter device to a specific row. Identification information typically includes product name, rate, net weight of the product, etc. Preferably, if the product identification is not for an authorized product then the operatively connected meter device will not operate. Each product container 130, 131 generally includes its own RFID tag 133.

In one embodiment of a planter in accordance with the principles of the present invention, sixteen sets of agricultural product containers may be used on a planter, for example side by side. For example, one of the containers may have a pesticide such as Aztec® pesticide for controlling insects. The other container may include, for example, a growth regulator for enhancing plant growth. In other embodiments, one or more of the containers may include a liquid. Thus, in one embodiment, there may be multiple meters per row, each meter being operatively connected to a product container of a set of product containers.

Applying the product directly into the furrow with the seed can eliminate the insecticide dust but still protect the seed. Also, some seed treatments may shorten seed life thereby making it impractical to save seed for the next year. Also, treating at planting time gives the farmer flexibility to use different seed treatments besides the seed treatment that the seed company has applied. Another use is relative to soil inoculants. Soybeans are inoculated and re-bagged but a high percentage of the inoculating organisms are dead by planting time. Applying the inoculants or other biologicals to the soil at planting time may greatly reduce the amount of product used because they can be stored under better conditions. Farmers have many other choices of products that may be applied at planting and may desire to apply more than one product with the planter.

Also, split-planter mapping has shown that when two different soil insecticides are applied at planting time one insecticide may provide a different yield response from the other insecticide. This is because different insecticides work against different insect species. The population of insects may vary according to soil types and conditions. Corn nematodes are more likely to be in sandy soils and soybean nematodes can vary according to the PH of the soil. Other soil insect pest populations vary according to the amount and type of organic material and soil moisture in the field. If a planter is equipped with different insecticides, they can be applied, by using GPS, to the area where they are needed. Planters already have the capability to change hybrids of corn as soil types and characteristics change.

Thus, the planter can be equipped with several different products and applied as need. Also, the products can be applied several different ways as needed. Product containers can be mounted in several locations on the planter as needed for application. As discussed above, there are several different placement options available for placing the product into or onto the soil. For example, the present invention may include, for example, in-furrow placement and/or banding above the furrow. As discussed, the system can run, for example 48 row units, with different products or rates in each row. Products can be applied together or applied in different areas. For example, one product can be applied in-furrow and another placed in a band. Also, sometimes multiple products such as seed treatments for disease and inoculants are applied to seeds at the same time but there is limited time for planting because they affect each other and will not be active unless planted within a specific time. Applying products which are packaged individually during a single pass of the planter improves operational efficiency and gives the farmer more flexibility.

Although the figures only show two containers in a set of containers, a set may include numerous product containers. Higher crop prices also make multiple treatments more economical. The present invention provides application of multiple products to the same row at planting time. As future agricultural science grows more products will become available. The present invention has the capability to apply them at planting according to soil type, insect pressure, soil fertility, and plant requirements.

In certain embodiments, the effectiveness of soil-applied chemicals can be increased at planting time by inducing seed and chemical granules into the same seed dispensing tube, delivering the chemical products and a seed in close proximity with each other in such a way that the chemical products are dispersed with the seed as the seed passes through the seed dispensing tube. For example, U.S. Pat. No. 6,938,564, entitled "Method and System for Concentrating Chemical Granules Around a Planted Seed," issued to Conrad, et al., discloses a system in which chemical granules are dispensed through a granule tube into a seed dispensing tube, where the granule tube is connected to the seed dispensing tube at a location above a lower opening of the seed dispensing tube, and where the lower opening of the seed dispensing tube is covered with a brush. A seed is dispensed through the seed dispensing tube. The brush holds chemical granules within the seed dispensing tube such that chemical granules accumulate within the seed dispensing tube, and the brush allows a seed and accumulated chemical granules to pass through the lower opening when the seed is dispensed via the seed dispensing tube.

Thus, precision placement of chemical around the seed can optimize chemical utilization. In certain embodiments the agricultural product may be dry and in others it may be liquid.

As mentioned above, in some embodiments rigid product containers 130 are used containing low application rate agricultural products. Such rigid product containers are designed to maintain product integrity during shipping and storage. A preferred rigid container is formed of high-density polyethylene (HDPE). The density of high-density polyethylene can range from about 0.93 to 0.97 grams/centimeter$^3$. An example of a suitable rigid container is high density polyethylene formed of Mobil™ HYA-21 HDPE or equivalent material. It preferably has a wall thickness of between about 0.17 to 0.28 inches.

For low rate products, when the weight of the inert ingredients (i.e. carrier) is lowered while the weight of the active ingredients is maintained approximately constant, then the consistency is maintained within control parameters and pest damage is also maintained within acceptable parameters.

Granules used as carriers may include, for example, the following:

Amorphous silica—bulk density in a range from about 0.160 to 0.335 g/mL,

Biodac® carrier—bulk density in a range from about 0.64 to 0.79 g/mL,

Clay—bulk density in a range from about 0.40 to 1.12 g/mL,

Sand—bulk density in a range from about 1.6 to 2.1 g/mL.

Granules loaded with chemicals will typically have a bulk density greater than the above values by about 10 to 30%.

A typical clay granule weighs from about 0.07 to 0.09 mg. A typical Biodac® granule weighs around 0.2 mg. A silica granule weighs from around 0.02 mg to 0.05 mg. A sand granule can weigh up to about 5 mg (coarse).

One example of a granule used as a carrier has a bulk density of 0.866 g/mL, an average granule size of 510 microns and an average granule weight of 0.082 mg.

The agricultural products may be insecticides or a wide variety of other crop enhancement agricultural products such as fungicides, plant growth regulators (PGRs), micro-nutrients, etc.

Most current meter designs for dry/granular products have a moving rotor in them that acts as a shut off device and is constantly spinning the product inside the insecticide hopper. As the application rate is reduced the percentage of granules that are ground up, relative to the total quantity of product being applied is affected, and therefore the application rate is affected. If a low application rate is used the meter orifice may be smaller than the free flow rate for the granules and will result in more grinding and an uneven product flow. Also, at turnoff, the meter paddle forms a pool of product around the orifice that flows out as the planter turns around at end rows. John Deere & Company and Kinze Manufacturing have made modifications to reduce this effect at rates in use today but these modifications would not be effective at the low application rate indicated here.

In one embodiment, the low application rate meter devices 132 have larger orifices than previous conventional meter devices so they can free flow at lower rates. Preferably, the orifice diameter is in a range of 0.20 inch to 0.50 inch. An example of such a low application rate meter device is embodied in the SmartBox Dispensing System which has an orifice diameter of 0.25 inch to 0.50 inch depending on the rate of the product used. The orifice diameter must be large enough to deliver more than the free flow of the intended product. The pulsing of the meter is one way to regulate the application rate of the product.

In industry today it is very common to use a seed treatment. Fungicide or an insecticide is used to treat the seed and its amount is limited to that which can be applied to the outside of the seed. Conventional dispensing systems are generally held by this limitation of applying product on the outside of the seed as a coating. However, if product can be applied in the furrow there can be substantial advantages. The present invention provides these advantages. In this embodiment, agricultural products are not applied directly onto the seed itself as a seed treatment. Instead they are applied in the zone of the seed, i.e. in the furrow. The present inventive features provide the ability to provide this placement. The seed itself is not required to be treated. Instead, the soil is treated. Use of seed coatings result in equipment problems, germination problems/complications, reduced seed viability, length of seed storage issues, etc. With the present invention minimization of seed as a carrier is provided. Many more options are provided to the farmer obviating issues regarding storing the seed from year to year.

Although the system for dispensing agricultural products at a low rate of the present invention has been discussed relative to its placement on a planter row unit, the system can be positioned on a planter off of the row unit. It can be placed on another part of the frame of the planter due to, for example space restrictions, preventing it from being placed directly on the planter row unit.

Referring now to FIG. 13, an example display (i.e., user interface screen) for a controller for pulsing the liquid valve 48 and the air valve 36 is illustrated, designated generally as 174. The display 174 can be part of the in cab monitor 50 or a stand alone controller. On time is the time the valve is applying product each time the valve is triggered. Off time is how long the valve is off when running in the check or calibration by pushing the "Start/Stop" Button. The Start/Stop button runs the valve without a seed signal according to the on and off time settings. This is used for timing and marking the pulse location for the physical setup when the planter is ran in the stationary mode (i.e. still in the shop). If the operator marks where the seed hits the bottom of the furrow he can line up where the agricultural product is applied in relation to the seed. Due to the low rates, multiple pulses are needed to get enough volume to see where the agricultural product is applied. While in the "Burst mode" the operator can put multiple spots down rather than a continuous strip. For example, the operator can pulse in multiple bursts adjusted by one millisecond timing on and off according to the on/off settings in a 2 inch strip. The result is still a continuous line of treatment but in multiple bursts. The multiple bursts are triggered by the seed. The cycle setting determines how many times the valves fires On/Off during when the seed triggering of the valve to fire. In other if the cycle time is set for 2 cycles, the valve will go on, then off, go on, then off.

The liquid input supply can come from any liquid supply system. The settings on the supply controller can be set for the ounces per acre. Then the supply controller can maintain the flow as the speed changes. Normally with a common fixed orifice spray type tip the spray pressure has to increase about 4 to 1 to double the flow. Technologies are now known to increase the flow range without as much pressure change. One is a new sprayer tip with a flexible orifice. It is made of a flexible material that the orifice opening expands as the pressure increases. It is similar to a rubber nipple on a baby bottle. The other possibility is modifying a common sprayer check valve. The standard check valve is just on/off and designed not to affect the flow control of the spray tip. Using a modified design of the standard type gas/liquid pressure regulator we can replace the ball in the check valve with a cone shaped needle held in place by a spring. As the pressure increase the flow increases without a large pressure increase. This modification can either be a standalone added device in supply line or incorporated into the variable rate flow tip.

Using the techniques above:
1. High speed pulsing within the target area
2. Flexible orifice
3. Modified check valve spray tip Various methods may be utilized to increase the range of ounce per acre without large increases supply pressure.

In some embodiments a common signal can fire multiple valves simultaneously.

Information from a closed delivery container's RFID tag may be combined with the application equipment's spatial positioning information to create and store, on a memory device that is separate and distinct from the container's RFID Tag, a geo-referenced record that indicates precisely where and/or when product from the container was dispensed and applied.

An automatically generated electronic record that indicates precisely where product from an RFID-tagged container was applied eliminates, for the user, the requirement to record by hand the application information associated with product which was dispensed from the RFID-tagged container, while also eliminating the potential for human error associated with hand-written or hand-entered notes or records.

An automatically generated electronic record that indicates precisely which product, the quantity of product, and the location at which product was dispensed from an RFID-tagged container ensures that all product applied from such containers is recorded in a uniformly consistent manner. Because the information that identifies the applied product will come from the coded information on the container's RFID tag, all product that is applied from containers with that same code may be recorded using information that is recorded in the same format. Such uniformity of data makes it easier, faster, and more accurate to aggregate and analyze application data from multiple containers, users, and locations. Accurate and cost-effective analysis of aggregated data enables better and more precise use-recommendations for future application of the same product.

The system may update various "as applied" data in the tag in addition to the product quantity data as the product is being dispensed from the cartridge. The as-applied data may, for example, include any one or more of the following, in any combination:
    an identifier of the product being dispensed by the cartridge;
    the rate at which the product is being dispensed by the cartridge;
    the current location of the cartridge; and
    the current time.

Any of the data disclosed herein, such as the as-applied data, may include one or more timestamps indicating one or more times associated with the data, such as a time at which the data was captured, created, or transmitted. Similarly, any of the data disclosed herein, such as the as-applied data, may include geographic information, such as geographic coordinates indicating a location associated with the data, such as a location at which the data was captured, created, or transmitted. Any such geographic information may, for example, be obtained automatically, such as by using GPS technology. The system may, for example, include a GPS module (not shown), such as described by Wintemute et al. in U.S. Patent Application Pub. No. 2017/0265374A1, for example, which generates output representing a current location of the system. Time may also be provided remotely such as via the GPS signal or through a separate clock or other time-keeping device. The system may use the output of such a GPS module to generate and store any of the location data disclosed herein. Embodiments of the present invention may correlate various data with each other using any of the timestamps and/or geographic information disclosed herein. For example, any two units of data having the same or similar timestamp may be correlated with each other. Similarly, any two units of data having the same or similar geographic location may be correlated with each other.

One reason to transmit and store the as-applied data over time is to enable the server to create an "as-applied map" of the product as it is actually applied to the field over time. The system may, for example, apply the product based on pre-selected data represented by a prescriptive map, which indicates the amount of the product that is intended to be applied at each of a variety of locations in the field. An as-applied map, and a prescriptive map are described below. The system may then vary the rate at which the product is applied at different locations in the field, in an attempt to apply, at each such location, the amount of the product that the prescriptive map specifies should be applied at that location. The actual amount of the product that the system applies at any particular location in the field may, however, deviate from the amount that the prescriptive map indicates should be applied. The system may use the measurements of the actual amounts of the product that were applied at various locations in the field to create an as-applied map for the product. The system may then compare the prescriptive map to the as-applied map to identify any variations between the amount of the product that was prescribed to be applied at each of a plurality of locations and the amount of the product that was actually applied at each of those locations.

One advantage of the techniques disclosed above for tracking changes in use of product stored in each cartridge, such as changes in the quantity of the product over time, is that these techniques may be performed in real-time, i.e., while quantities of the product are being added to and/or dispensed from the cartridge. The term "real-time," as used herein in connection with tracking changing quantities of the product, refers to tracking such changes and repeatedly updating the tag accordingly, at repeated intervals without a substantial delay between the change in the quantity or other use parameter of the product and the resulting update(s) to the corresponding product use data in the tag (e.g., the product quantity data and/or the product type data).

Another advantage of the techniques disclosed above for tracking changes in the quantity of the product over time is that these techniques may be performed automatically, i.e., without human intervention. For example, existing systems typically require the human operator of a tractor or planter to manually record the amount of product that has been applied to a field. This manual process has a variety of drawbacks. For example, manual recording of product application is prone to error for a variety of reasons, such as the difficulty of manually measuring the amount of product that has been dispensed and limitations in the operator's memory. As another example, manual recording of product application is prone to intentional fraud. As yet another example, manual recording can require a significant amount of effort, which may result in delays in the recording process. Embodiments of the present invention address all of these problems. For example, embodiments of the present invention may track changes in the product in the cartridge (such as changes in the type of the product, increases in the quantity of the product, and decreases in the quantity of the product) automatically, i.e., without requiring manual human input. Such automatic tracking may be performed, for example, in the operation of filling the cartridge), the operation of updating the tag as the product is being dispensed, and the operation of updating the as-applied data. This automatic tracking eliminates the need for the human operator to perform tracking manually and thereby avoids all of the problems of manual tracking described above. Furthermore, embodiments of the present invention may even prohibit the human operator from manually recording or modifying automatically-recorded information (such as the product quantity data, product type data, cartridge ID, and as-applied data), thereby both eliminating the risk of inadvertent human error and the risk of intentional fraud.

Furthermore, embodiments of the present invention may track and record product-related data both automatically and in real-time. This combination of features enables changes in the type and quantity of the product to be tracked more quickly, easily, and reliably than existing systems which rely on manual human input. For example, by automatically monitoring the rates at which the product is applied in various locations over time, by tying such information to the ID of the cartridge that dispensed the product, and by transmitting all such data to the server for storage in the measurement data, embodiments of the present invention may create an as-applied map of the product as actually applied to the field, all without the involvement of the operator or farmer. Such capabilities provide real inventory management benefits to the manufacturers of the product and to the supply chain between the manufacturer and the end user of the cartridge. Furthermore, these features eliminate the burden of having to store the as-applied data locally (e.g., in a flash drive or other physical medium) and then to physically transport it to a computer, by enabling the as-applied data to be transmitted wirelessly, automatically, and in real-time to the server.

The ability to generate an as-applied map automatically enables the agricultural products that were applied to specific crops to be tracked without being dependent on manual reporting from farmers for veracity or accuracy. This ability to track which products were applied to individual crops, independently of farmer reporting, is particularly useful for satisfying demands from consumers to know which products were applied to the foods they purchase and for satisfying the need of regulatory agencies and food processors to obtain access to field-specific agricultural product use.

The retailer invoices the farmer for the amount of product used by the farmer from the cartridge. This invoicing process may be performed in any of a variety of ways. For example, the cartridge interface device may include a product use determination module. In general, the product use determination module may determine the amount of product that was used by the farmer (e.g., the amount of product that was dispensed from the cartridge and/or the total area or rows in fields treated with the product) since the cartridge was acquired by the farmer, since the cartridge was last filled, or since the farmer was last invoiced for use of the product and/or cartridge. The product use determination module may product an output signal representing this amount of the product used.

The product use determination module may produce the product use amount signal in any of a variety of ways. For example, the tag reader may produce, based on the data read by the tag reader from the tag, a read data signal representing some or all of the data read by the tag reader from the tag. The read data signal may, for example, represent all data read by the tag reader from the tag. If the read data already includes data representing an amount of the product used by the farmer, then the product use determination module may identify this amount in the read data signal and output that amount in the product use amount signal. As another example, if the read data signal includes data representing a previous amount of the product in the cartridge (e.g., the amount of the product that was contained in the cartridge when the farmer previously obtained or filled the cartridge with the product) and data representing the current amount of the product in the cartridge, then the product use determination module may calculate the difference between these two amounts and output the resulting difference (e.g., current amount minus previous amount) in the product use amount signal.

The product use determination module may calculate an invoice amount based on the identified amount of the product used, in any of a variety of ways, and output an invoice amount signal representing the calculated invoice amount. For example, the product use determination module may identify a unit price of the product (e.g., price per unit of volume, mass, length of rows treated, and/or areas of fields treated) and multiply the unit price by the amount (e.g., volume, mass, length or area) of product used (represented by the product use amount signal) to produce a product representing the invoice amount, which the product use determination module may include in the invoice amount signal.

The product use determination module may identify the unit price of the product in any of a variety of ways. For example, the product use determination module may identify the type of the product, such as by identifying the type of the product based on the product type data, as read by the tag reader from the tag and included in the read data. The product use determination module may identify the unit price of the product based on the type of the product, such as using the product type to look up a corresponding unit price in a mapping (e.g., database table) of product types to unit prices.

Regardless of how the amount of product actually used is calculated, charging the farmer only for the amount of the product that the farmer actually used may both reduce the cost of each cartridge use for the farmer and encourage the farmer to use the cartridge because of the knowledge that the price the farmer will pay for the cartridge will be limited by the amount of the product that the farmer actually uses.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), General Purpose Processors (GPPs), Microcontroller Units (MCUs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of some of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

As mentioned above, other embodiments and configurations may be devised without departing from the spirit of the invention and the scope of the appended claims.

The invention claimed is:

1. A system for dispensing multiple low rate agricultural products, comprising:
   a multiple low rate agricultural (MLRA) product application device configured to cooperate with a planting equipment monitor assembly positioned to sense a seed being discharged from high speed planting equipment, wherein each MLRA product application device comprises a common housing for a plurality of low rate agricultural product input assemblies for dispensing crop enhancement agricultural products in furrow.

2. The system of claim 1, wherein each MLRA product application device comprises said common housing is for a liquid agricultural product input assembly and a dry, flowable agricultural product input assembly.

3. The system of claim 1, wherein each MLRA product application device, comprises:
   a) said common housing; and,
   b) a plurality of low rate agricultural product input assemblies having exit ports supported by said common housing.

4. The system of claim 1, wherein each MLRA product application device, comprises:
   a) said common housing comprising at least one plate; and,
   b) a plurality of low rate agricultural product input assemblies having exit sections supported by said common housing.

5. The system of claim 1, wherein each MLRA product application device, comprises:
   a) said common housing comprising two plates securely supported in a spaced apart position; and,
   b) a plurality of low rate agricultural product input assemblies having exit sections supported by said common housing, between said two plates.

6. The system of claim 1, wherein each MLRA product application device, comprises:
   a) said common housing including a plurality of mounting holes; and,
   b) a plurality of low rate agricultural product input assemblies having exit sections supported by said common housing, wherein said mounting holes provide adjustment of said low rate agricultural product input assemblies for desired prescriptive discharge.

7. The system of claim 1, wherein each MLRA product application device comprises said common housing for a plurality of low rate agricultural product input assemblies, wherein a first of said plurality of low rate agricultural product input assemblies comprises a liquid agricultural product input assembly comprising a liquid agricultural product input line; and, a second of said low rate agricultural product input assemblies comprises a dry, flowable agricultural product input assembly comprising a dry, flowable agricultural product input line.

8. The system of claim 7, wherein said dry, flowable agricultural product input assembly comprises:
   a) said dry, flowable agricultural product input line;
   b) an air line/wire component connectable to an air source;
   c) an air valve operatively connected to said air line/wire component;
   d) a combination section positioned to receive dry, flowable agricultural product from said dry, flowable agricultural product input line and air from said air valve, said combination section configured to receive the dry, flowable agricultural product and hold said dry, flowable agricultural product until said air from said air valve discharges the dry, flowable agricultural product;

e) a combined dry, flowable/air outlet section connected to said combination section and configured to discharge the dry, flowable agricultural product.

9. The system of claim 8, wherein said combined dry, flowable/air outlet section further comprises an optional discharge port assembly configured to provide desired angular adjustments of a placement of said dry, flowable agricultural product.

10. The system of claim 7, wherein said liquid agricultural product input assembly comprises:
a) said liquid agricultural product input line;
b) a liquid line/wire component connectable to a liquid source; and,
c) a liquid valve operatively connected to said liquid line/wire component for regulating a discharge of said liquid agricultural product.

11. The system of claim 1, further including said planting equipment monitor assembly, comprising:
a) an in-cab monitor including a seed status light;
b) a planter assembly control module operatively connected to said in-cab monitor, for interfacing input signals from planter sensors; and,
c) connection means operatively connected to said planter assembly control module and said planter sensors.

12. The system of claim 1, further including said planting equipment monitor assembly, comprising:
a) a control module including a seed status light; and,
b) connection means for operatively connecting the control module with planter functions.

13. The system of claim 1, further including said planting equipment monitor assembly, comprising:
a) a seed tube integrated unit including a seed status light;
b) a control module operatively connected to said seed tube integrated unit, for interfacing input signals from planter sensors and for controlling planter functions; and,
c) connection means for operatively connecting the control module and said planter sensors.

14. The system of claim 1, wherein said multiple low rate agricultural product application device is configured to dispense dry, flowable agricultural products at an application rate being defined as a rate below 3 ounces per 1000 feet of row.

15. The system of claim 1, wherein said multiple low rate agricultural product application device is configured to dispense liquid agricultural products at an application rate being defined as a rate below 3.7 fluid ounces per 1000 row feet.

16. The system of claim 1, wherein each MLRA product application device comprises a low rate agricultural product input assembly including a placement tube assembly mounted between depth wheels of a depth control wheel assembly of a planter for placement of product in-furrow between the depth wheels thereof; and, wherein each of the placement tube assemblies includes an elongated placement tube arranged so that it descends from a portion of a frame of the planter behind the depth wheels to between the depth wheels.

17. The system of claim 1, wherein each MLRA product application device comprises a low rate agricultural product input assembly including a placement tube assembly mounted between opening discs and depth wheels of a depth control wheel assembly of a planter for placement of product in-furrow between the opening discs and the depth wheels thereof; and, wherein each of the placement tube assemblies includes an elongated placement tube arranged so that it descends from a portion of a frame of the planter behind the depth wheels to between the opening discs and the depth wheels.

18. The system of claim 1, wherein:
an agricultural product metering system is operably connected to said MLRA product application device, said agricultural product metering system comprising a syringe-based pump system.

19. A method for dispensing multiple low rate agricultural products, comprising:
utilizing a multiple low rate agricultural (MLRA) product application device configured to cooperate with a planting equipment monitor assembly positioned to sense a seed being discharged from high speed planting equipment, wherein each MLRA product application device comprises a common housing for a plurality of low rate agricultural product input assemblies for dispensing crop enhancement agricultural products in furrow.

* * * * *